US011736531B1

(12) United States Patent
Cirello Filho et al.

(10) Patent No.: US 11,736,531 B1
(45) Date of Patent: Aug. 22, 2023

(54) MANAGING AND MONITORING ENDPOINT ACTIVITY IN SECURED NETWORKS

(71) Applicant: strongDM, Inc., New York, NY (US)

(72) Inventors: Carlos Ulderico Cirello Filho, Burlingame, CA (US); Philip D. Hassey, Rye, CO (US)

(73) Assignee: strongDM, Inc., New York, NY (US)

( * ) Notice: Subject to any disclaimer, the term of this patent is extended or adjusted under 35 U.S.C. 154(b) by 0 days.

(21) Appl. No.: 17/900,121

(22) Filed: Aug. 31, 2022

(51) Int. Cl.
*H04L 29/06* (2006.01)
*H04L 9/40* (2022.01)
*H04L 41/0604* (2022.01)

(52) U.S. Cl.
CPC .......... *H04L 63/20* (2013.01); *H04L 41/0627* (2013.01); *H04L 63/029* (2013.01)

(58) Field of Classification Search
CPC ....... H04L 63/10; H04L 63/20; H04L 63/029; H04L 63/04; H04L 63/168; H04L 63/107
USPC .......................................................... 726/1
See application file for complete search history.

(56) References Cited

U.S. PATENT DOCUMENTS

| 7,233,569 | B1 | 6/2007 | Swallow | |
|---|---|---|---|---|
| 7,752,466 | B2 | 7/2010 | Ginter et al. | |
| 8,102,814 | B2 | 1/2012 | Rahman et al. | |
| 9,178,793 | B1 * | 11/2015 | Marlow | H04L 63/0227 |
| 9,239,834 | B2 * | 1/2016 | Donabedian | G06F 40/58 |
| 9,300,635 | B1 | 3/2016 | Glide et al. | |
| 9,632,828 | B1 | 4/2017 | Mehta et al. | |
| 9,800,517 | B1 | 10/2017 | Anderson | |
| 11,102,147 | B2 | 8/2021 | Mehta et al. | |
| 11,290,143 | B1 | 3/2022 | Sternowski | |
| 11,316,822 | B1 | 4/2022 | Gawade et al. | |
| 11,323,919 | B1 | 5/2022 | Parulkar et al. | |
| 11,375,300 | B2 | 6/2022 | Sagie et al. | |
| 11,412,051 | B1 | 8/2022 | Chiganmi et al. | |
| 11,528,147 | B2 * | 12/2022 | Madisetti | H04L 67/104 |
| 11,546,763 | B1 * | 1/2023 | Cirello Filho | H04W 12/06 |
| 2005/0164650 | A1 | 7/2005 | Johnson | |
| 2007/0009104 | A1 | 1/2007 | Renkis | |
| 2009/0037607 | A1 | 2/2009 | Farinacci et al. | |

(Continued)

OTHER PUBLICATIONS

Office Communication for U.S. Appl. No. 17/733,735 dated Jul. 12, 2022, pp. 1-38.

(Continued)

*Primary Examiner* — Longbit Chai
(74) *Attorney, Agent, or Firm* — John W. Branch; Branch Partners PLLC

(57) ABSTRACT

Embodiments are directed to managing and monitoring endpoint activity in secured networks. In response to a client request being provided to an agent associated with the resource server. A driver associated with the resource server may be determined based on the client request. The client request may be provided to the resource server via a second network connection. Responses from the resource server may be provided to a server-tee module such that the server-tee module provides a copy of the responses to the server-handler module; employing the server-handler module to generate log information based on the copied responses; employing the server-tee module to modify the responses from the resource server such that the responses are forwarded to the client via the first network connection over the overlay network; or the like.

30 Claims, 19 Drawing Sheets

(56) References Cited

U.S. PATENT DOCUMENTS

| | | |
|---|---|---|
| 2009/0164663 A1 | 6/2009 | Ransom et al. |
| 2009/0222559 A1 | 9/2009 | Anipko et al. |
| 2011/0225311 A1 | 9/2011 | Liu et al. |
| 2013/0198558 A1 | 8/2013 | Rao et al. |
| 2016/0014669 A1 | 1/2016 | Patil et al. |
| 2016/0014818 A1 | 1/2016 | Reitsma et al. |
| 2017/0126734 A1 | 5/2017 | Harney |
| 2017/0279971 A1 | 9/2017 | Raleigh et al. |
| 2018/0061158 A1 | 3/2018 | Greene |
| 2018/0123957 A1 | 5/2018 | Chen et al. |
| 2019/0039569 A1 | 2/2019 | Reed et al. |
| 2019/0116132 A1 | 4/2019 | Suzuki |
| 2020/0219023 A1 | 7/2020 | Duchastel |
| 2020/0220848 A1 | 7/2020 | Patwardhan |
| 2020/0322286 A1 | 10/2020 | Mehta et al. |
| 2020/0323030 A1 | 10/2020 | Mehta et al. |
| 2021/0056536 A1 | 2/2021 | Carter et al. |
| 2021/0168661 A1 | 6/2021 | Wong et al. |
| 2021/0211423 A1 | 7/2021 | Tan et al. |
| 2021/0226910 A1 | 7/2021 | Ranpise et al. |
| 2021/0314399 A1 | 10/2021 | Hyun et al. |
| 2021/0344492 A1 | 11/2021 | Goodsitt et al. |
| 2022/0150312 A1 | 5/2022 | Ranpise et al. |
| 2022/0217084 A1 | 7/2022 | Arora et al. |
| 2022/0263913 A1 | 8/2022 | Zhang et al. |
| 2022/0329477 A1 | 10/2022 | Chiganmi et al. |
| 2022/0334864 A1 | 10/2022 | K N et al. |

OTHER PUBLICATIONS

Office Communication for U.S. Appl. No. 17/733,735 dated Nov. 1, 2022, pp. 1-7.
Office Communication for U.S. Appl. No. 17/889,788 dated Nov. 7, 2022, pp. 1-12.
Office Communication for U.S. Appl. No. 17/954,697 dated Jan. 20, 2023, pp. 1-13.
Office Communication for U.S. Appl. No. 18/094,858 dated Mar. 16, 2023, pp. 1-10.

* cited by examiner

US 11,736,531 B1

MANAGING AND MONITORING ENDPOINT ACTIVITY IN SECURED NETWORKS

TECHNICAL FIELD

The present invention relates generally to network security, and more particularly, but not exclusively, to managing and monitoring endpoint activity in secured networks.

BACKGROUND

As organizations become increasingly dependent on networked environments, remote services, distributed services, or the like, managing and monitoring infrastructure access in networked environments can become both critically important and more difficult. Difficulties in managing network environments may not be new, however, interconnections among remote offices, data centers, remote employees, remote customers, and so on, have resulted in organizations relying more broadly on heterogeneous distributed networked services, or the like. Also, in some cases, regulatory environment has been adapting to the increase in computer-based services. Accordingly, organizations may be required to comply with regulatory regimes from multiple jurisdictions related to various critical subjects, such as, finance, privacy, employee rights, cross jurisdiction taxation, and so on. The combination of the increase in reliance on distributed and networked services and ongoing changes in regulatory environments has tended to elevate the importance of managing and monitoring infrastructure access in networked environments both for operations as well as compliance with various regulatory regimes. Credential management is an important feature of infrastructure security. In some cases, it may be difficult to provide centralized management of technology infrastructure without enabling centralized access to the services providing infrastructure security management. In some cases, enabling infrastructure security services to directly access or maintain credential information may increase the security risk associated with such services. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein.

DETAILED DESCRIPTION OF VARIOUS EMBODIMENTS

Figure 1:
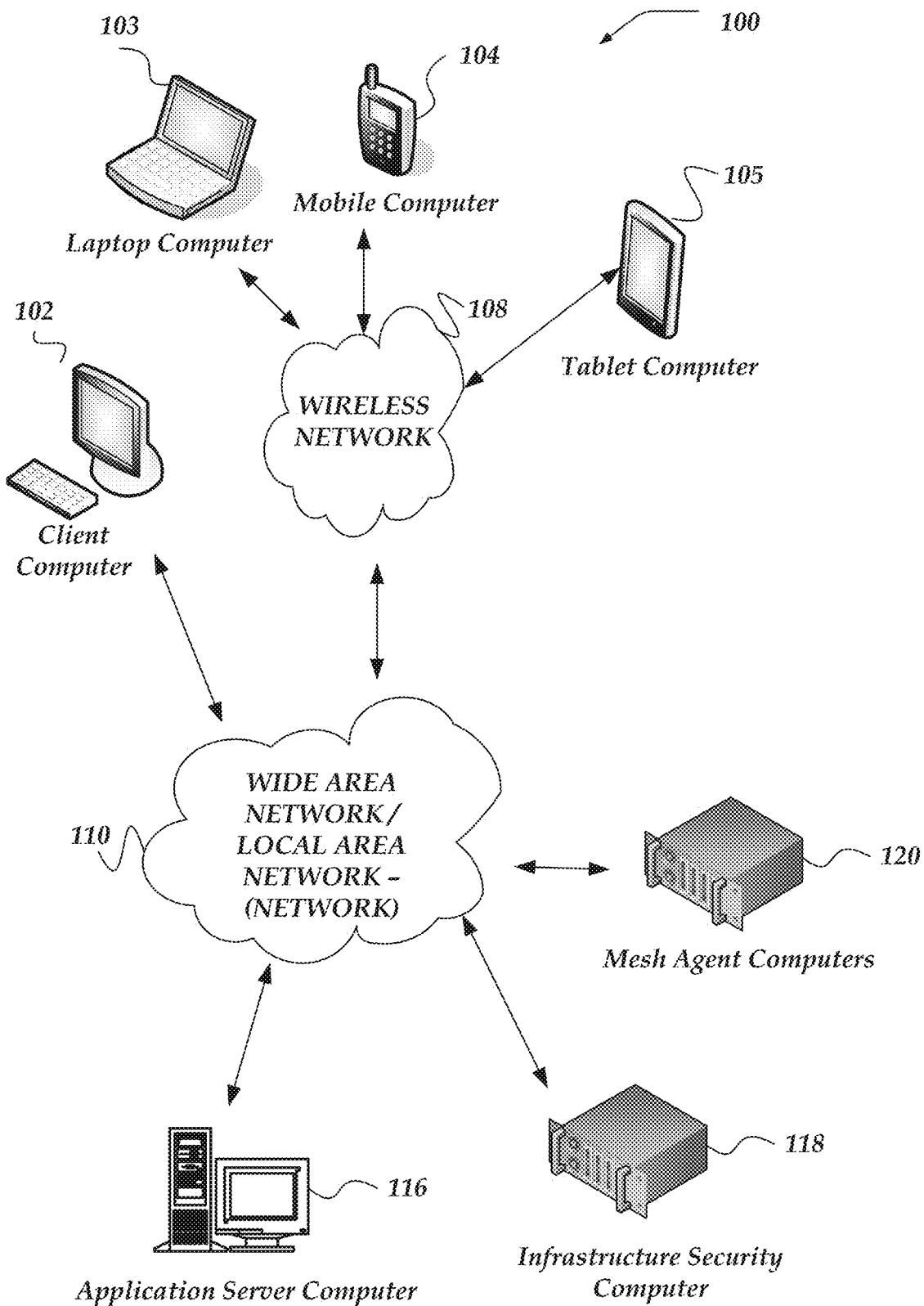
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PHP, Perl, Python, R, Julia, JavaScript, Ruby, VBScript, Microsoft.NET™ languages such as C#, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein, the term "session" refers to a semi-permanent interactive packet interchange between two or more communicating endpoints in a networked environment. A session is set up or established at a certain point in time, and torn down at a later point in time. An established communication session may involve more than one message in each direction. A session may have stateful communication where at least one of the communicating endpoints saves information about the session history to be able to communicate. A session may also provide stateless communication, where the communication consists of independent requests with responses between the endpoints. An established session is the basic requirement to perform a connection-oriented communication. A session also is the basic step to transmit in connectionless communication modes.

As used herein, the terms "network connection," and "connection" refer to communication sessions with a semi-permanent connection for interactive packet interchange between two or more communicating endpoints, such as network devices. The connection may be established before application data is transferred, and where a stream of data is delivered in the same or different order than it was sent. The alternative to connection-oriented transmission is connectionless communication. For example, the datagram mode of communication used by the Internet Protocol (IP) and the Universal Datagram Protocol (UDP) may deliver packets out of order, since different packets may be routed independently and could be delivered over different paths. Packets associated with a TCP protocol connection may also be routed independently and could be delivered over different paths. However, for TCP connections the network communication system may provide the packets to application endpoints in the correct order.

As used herein, the term "tuple" refers to a set of values that identify a source and destination of a network communication or network traffic packet, which may, under some circumstances, be a part of a network connection. In one embodiment, a tuple may include a source Internet Protocol (IP) address, a destination IP address, a source port number, a destination port number, virtual LAN segment identifier (VLAN ID), tunnel identifier, routing interface identifier, physical interface identifier, or a protocol identifier. Tuples may be used to identify network flows (e.g., connection flows).

As used herein, the term, "protocol" refers generally to network protocols that may be employed in a network, including data-link layer protocols, transport layer protocols, application layer protocols, or the like. Thus, unless otherwise indicated, innovations described as working with or being associated with a protocol may be applicable to protocols of various OSI layers, or the like, or combination thereof.

As used herein, the term, "application protocol" refers generally to comminication protocols that may be employed in a network that enable one or more applications or services and their client applications to communicate in a networked environment. Application protocols may be considered distinct from transport protocols that may be used to ferry application protocol traffic in networks or among processes/services.

As used herein, the term "mesh agent" refers to programs, process, or services that provide a node, link, or hop in a software defined network. Multiple mesh agents may provide secure tunnels between each other to provide a secure overlay network that may be provided in a conventional underlay network. In some cases, one or more mesh agents may be hosted on network computers in a networked environment.

As used herein, the term "ingress agent" refers to a mesh agent that a client application or user gains access to an overlay network. Ingress agents may be considered mesh agents that are on a logical edge of an overlay network. For example, if a client application requires access to an overlay network to access a protected resource, the first mesh agent that the client application communicates to join or access the overlay network may be considered an ingress agent.

As used herein, the term "egress agent" refers to a mesh agent that may directly communicate with a protected resource. Egress agents may be considered mesh agents that are on a logical edge of an overlay network. For example, client requests provided by a client to an ingress agent may be forwarded through one or more mesh agents in an overlay network until they reach an egress agent associated with the target resource.

As used herein, the term "credential vault" refers to services or systems organizations may employ to manage credential secrets that may be used to access various resources in protected networks. Credential vaults may include user directories, LDAP servers, file systems, pass-word managers, configuration databases, or the like. Credential vaults may provide one or more schemes or interfaces that enable programmatic access to the credential secrets stored in a credential vault.

As used herein, the term "credential instruction" refers data or data structures that may be interpreted to determine one or more locations, actions, options, or the like, for obtaining credential secrets from one or more credential vaults. Credential instructions may include enough information to obtain credential secrets without including secret information. Thus, if credential instructions are compromised by malicious actors, credential secrets may remain uncompromised.

As used herein, the term "credential information" refers to data or data structures that include credential secrets that enable access to protected resource servers. For example, credential information may include usernames, passwords, pass-phrases, security certificates, or the like.

As used herein, the term, "configuration information" refers to information that may include rule based policies, pattern matching, scripts (e.g., computer readable instructions), or the like, that may be provided from various sources, including, configuration files, databases, user input, built-in defaults, or the like, or combination thereof. In some cases, configuration information may include or reference information stored in other systems or services, such as, configuration management databases, Lightweight Directory Access Protocol (LDAP) servers, name services, public key infrastructure services, or the like.

The following briefly describes embodiments of the invention to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to managing and monitoring endpoint activity in secured networks. In one or more of the various embodiments, an overlay network that may be employed to provide a secure tunnel between a client and a resource server may be provided.

In one or more of the various embodiments, in response to a client request being provided to an agent associated with the resource server such that the client request may be provided via a first network connection further actions may be performed, including: determining a driver that may be associated with the resource server based on the client request such that the driver includes one or more of a server-tee module and a server-handler module; providing the client request to the resource server via a second network connection; providing one or more responses from the resource server to the server-tee module such that the server-tee module provides a copy of the one or more responses from the resource server to the server-handler module; employing the server-handler module to generate log information based on the one or more copied responses; employing the server-tee module to modify the one or more responses from the resource server such that the one or more responses are forwarded to the client via the first network connection over the overlay network; or the like.

In one or more of the various embodiments, performing the further actions in response to the client request, includes, employing a dialer module included in the driver to establish a second network connection between the agent and the resource server such that the second network connection may be employed to exchange network traffic between the agent the resource server.

In one or more of the various embodiments, performing further actions in response to the client request, includes: providing credential information associated with the client to a preamble module that may be included in the driver; employing the preamble module to exchange one or more messages with the resource server based on an application protocol associated with the resource server; establishing the application session between the agent and the resource server based on the one or more messages; or the like.

In one or more of the various embodiments, employing the server-tee module to modify the one or more responses from the resource server may include: inspecting network traffic associated with the one or more responses based on an application protocol associated with the resource server; modifying the network traffic to replace one or more values in the inspected network traffic with one or more other values based on the application protocol and one or more overlay network policies; modifying the one or more responses to include the modified network traffic; or the like.

In one or more of the various embodiments, employing the server-handler module to generate the log information may include: inspecting network traffic associated with the one or more copied responses; determining one or more activity records associated with the one or more copied responses based on an application protocol associated with the resource server such that each activity record corresponds to a copied response; storing the one or more activity records in a log information data store; or the like.

In one or more of the various embodiments, employing the server-handler module to generate the log information may include: inspecting network traffic associated with the one or more copied responses; collecting one or more activity records associated with the one or more copied responses; in response to the collection of the one or more activity records matching one or more conditions based on the application protocol and the server-handler module, generating one or more activity frames based on the one or more collected activity records such that the one or more activity frames may be stored in a log data store; or the like.

In one or more of the various embodiments, performing further actions in response to the client request, includes: in response to an application session associated with the client request terminating, employing a finalizer module included in the driver to execute one or more actions to remove one or more artifacts associated with the application session based on the application protocol or the resource server.

In one or more of the various embodiments, performing further actions in response to the client request, includes: in response to detecting an error associated with the one or more responses, performing one or more other actions, including: classifying the error based on one or more of an application protocol associated with the resource server, or network traffic associated with a network connection to the resource server; resolving the classified error based on a classification of the error as resolvable such that the resolution of the error includes one or more of resending one or more client requests, or sending one or more modified client requests and such that the modifications to the one or more modified client requests include setting one or more values in the one or more modified client requests based on the application protocol.

Illustrated Operating Environment

FIG. 1 shows components of one embodiment of an environment in which embodiments of the innovations disclosed herein may be practiced. Not all of the components may be required to practice these innovations, and variations in the arrangement and type of the components may be made without departing from the spirit or scope of these innovations. As shown, system 100 of FIG. 1 includes local area networks (LANs)/wide area networks (WANs)— (network) 110, wireless network 108, client computers 102-105, application server computer 116, infrastructure security computer 118, one or more mesh agent computers 120, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), eXtensible Markup Language (XML), JavaScript Object Notation (JSON), Cascading Style Sheets (CS S), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, application server computer 116, infrastructure security computer 118, mesh agent computers 120, or other computers.

Client computers 102-105 may further be configured to include a client application that enables an end-user to log into an end-user account that may be managed by another computer, such as application server computer 116, infrastructure security computer 118, mesh agent computers 120, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Further, client computers may be arranged to enable users to provide configuration information, policy information, or the like, to infrastructure security computer 118. Also, client computers may be arranged to enable users to display reports, interactive user-interfaces, results provided by infrastructure security computer 118, mesh agent computers 120, or the like. Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobile communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, application server computer 116, infrastructure security computer 118, mesh agent computers 120, client computers 102-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information using one or more network protocols, such Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

One embodiment of application server computer 116, infrastructure security computer 118, and mesh agent computers 120 are described in more detail below in conjunction with FIG. 3. Although FIG. 1 illustrates application server computer 116, infrastructure security computer 118, and mesh agent computers 120 each as a single computer, the innovations or embodiments are not so limited. For example, one or more functions of application server computer 116, infrastructure security computer 118, and mesh agent computers 120, or the like, may be distributed across one or more distinct network computers. Moreover, in one or more embodiments, infrastructure security computer 118 may be implemented using a plurality of network computers. Further, in one or more of the various embodiments, application server computer 116, infrastructure security computer 118, or mesh agents 120 may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
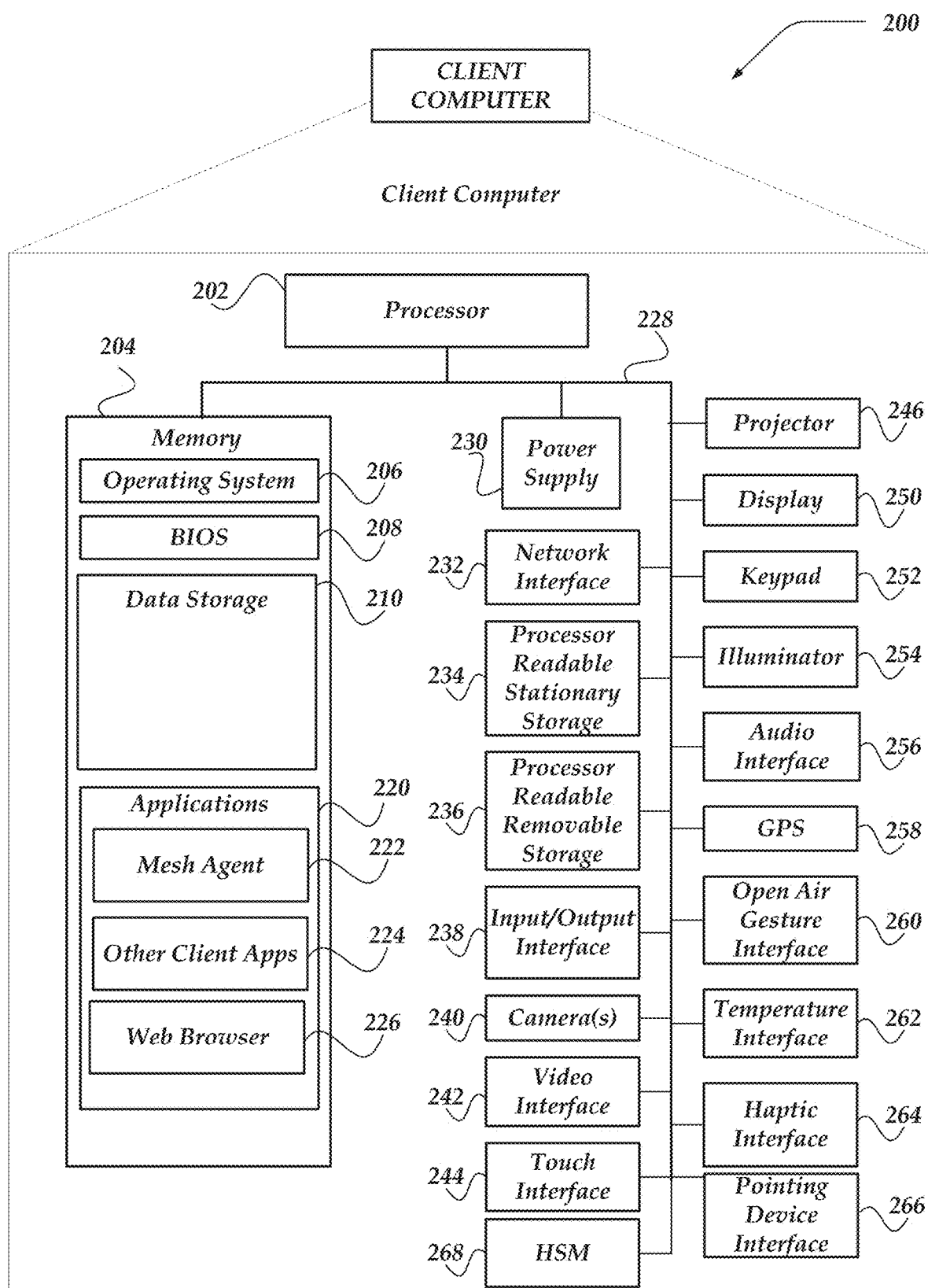
FIG. 2 illustrates a schematic embodiment of a client computer.

FIG. 2 shows one embodiment of client computer 200 that may include many more or less components than those shown. Client computer 200 may represent, for example, at least one embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 for measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (MC).

Audio interface 256 may be arranged to produce and receive audio signals such as the sound of a human voice. For example, audio interface 256 may be coupled to a speaker and microphone (not shown) to enable telecommunication with others or generate an audio acknowledgement for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiments, however, client computer 200 may, through other components, provide other information that may be employed to determine a physical location of the client computer, including for example, a Media Access Control (MAC) address, IP address, and the like.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX®, or Linux®, or a specialized client computer communication operating system such as Windows Phone™, or the Symbian® operating system. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by processors, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, mesh agent 222, other client applications 224, web browser 226, or the like. Client computers may be arranged to exchange communications, such as, queries, searches, messages, notification messages, event messages, alerts, log data, API calls, or the like, combination thereof, with application servers. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include one or more embedded logic hardware devices instead of CPUs, such as, an Application Specific Integrated Circuit (ASIC), Field Programmable Gate Array (FPGA), Programmable Array Logic (PAL), or the like, or combination thereof. The embedded logic hardware devices may directly execute embedded logic to perform actions. Also, in one or more embodiments (not shown in the figures), client computer 200 may include one or more hardware microcontrollers instead of CPUs. In one or more embodiments, the microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Network Computer

Figure 3:
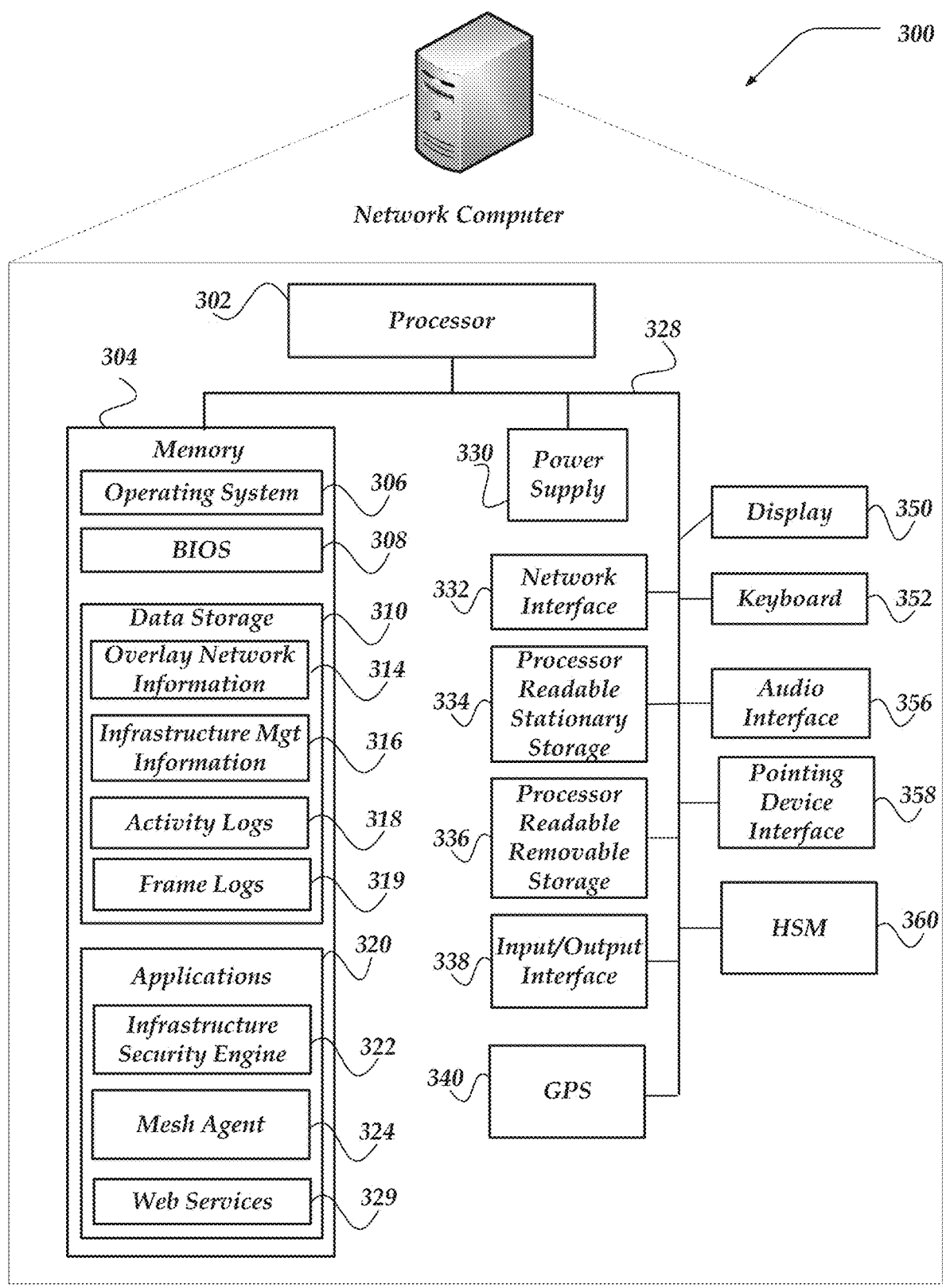
FIG. 3 illustrates a schematic embodiment of a network computer.

FIG. 3 shows one embodiment of network computer 300 that may be included in a system implementing at least one of the various embodiments. Network computer 300 may include many more or less components than those shown in FIG. 3. However, the components shown are sufficient to disclose an illustrative embodiment for practicing these innovations. Network computer 300 may represent, for example, one embodiment of at least one of application server computer 116, infrastructure security computer 118, or mesh agent computers 120 FIG. 1.

As shown in the figure, network computer 300 includes a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiment, however, network computer 300 may, through other components, provide other information that may be employed to determine a physical location of the client computer, including for example, a Media Access Control (MAC) address, IP address, and the like.

In at least one of the various embodiments, applications, such as, operating system 306, overlay network engine 322, mesh agent 324, web services 329, or the like, may be arranged to employ geo-location information to select one or more localization features, such as, time zones, languages, currencies, calendar formatting, or the like. Also, localization features may be used when interpreting network traffic, application protocols, modifying/localizing client requests, modifying/localizing server responses, user-interfaces, generating reports, monitoring infrastructure access in different regions, or the like. Localization may be employed by one or more internal processes or databases. In at least one of the various embodiments, geo-location information used for selecting localization information may be provided by GPS 340. Also, in some embodiments, geolocation information may include information provided using one or more geo-location protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX®, or Linux®, or a specialized operating system such as Microsoft Corporation's Windows® operating system, or the Apple Corporation's IOS operating system. Operating systems may include, or interface with a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, overlay network information 314, infrastructure management information 316, activity logs 318, frame capture logs 319, or the like.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include overlay network engine 322, mesh agent 324, web services 329, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, overlay network engine 322, mesh agent 324, web services 329, or the like, may be operative in a cloud-based computing environment. In one or more of the various embodiments, these applications, and others may be executing within virtual machines or virtual servers that may be managed in a cloud-based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to overlay network engine 322, mesh agent 324, web services 329, or the like, may be provisioned and de-commissioned automatically.

Also, in one or more of the various embodiments, overlay network engine 322, mesh agent 324, web services 329, or the like, may be located in virtual servers running in a cloud-based computing environment rather than being tied to one or more specific physical network computers. Likewise, in some embodiments, one or more of overlay network engine 322, mesh agent 324, web services 329, or the like, may be configured to execute in a container-based environment.

Further, network computer 300 may also comprise hardware security module (HSM) 360 for providing additional tamper resistant safeguards for generating, storing or using security/cryptographic information such as, keys, digital certificates, passwords, passphrases, two-factor authentication information, or the like. In some embodiments, hardware security modules may be employed to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include one or more embedded logic hardware devices instead of CPUs, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of CPUs. In one or more embodiments, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
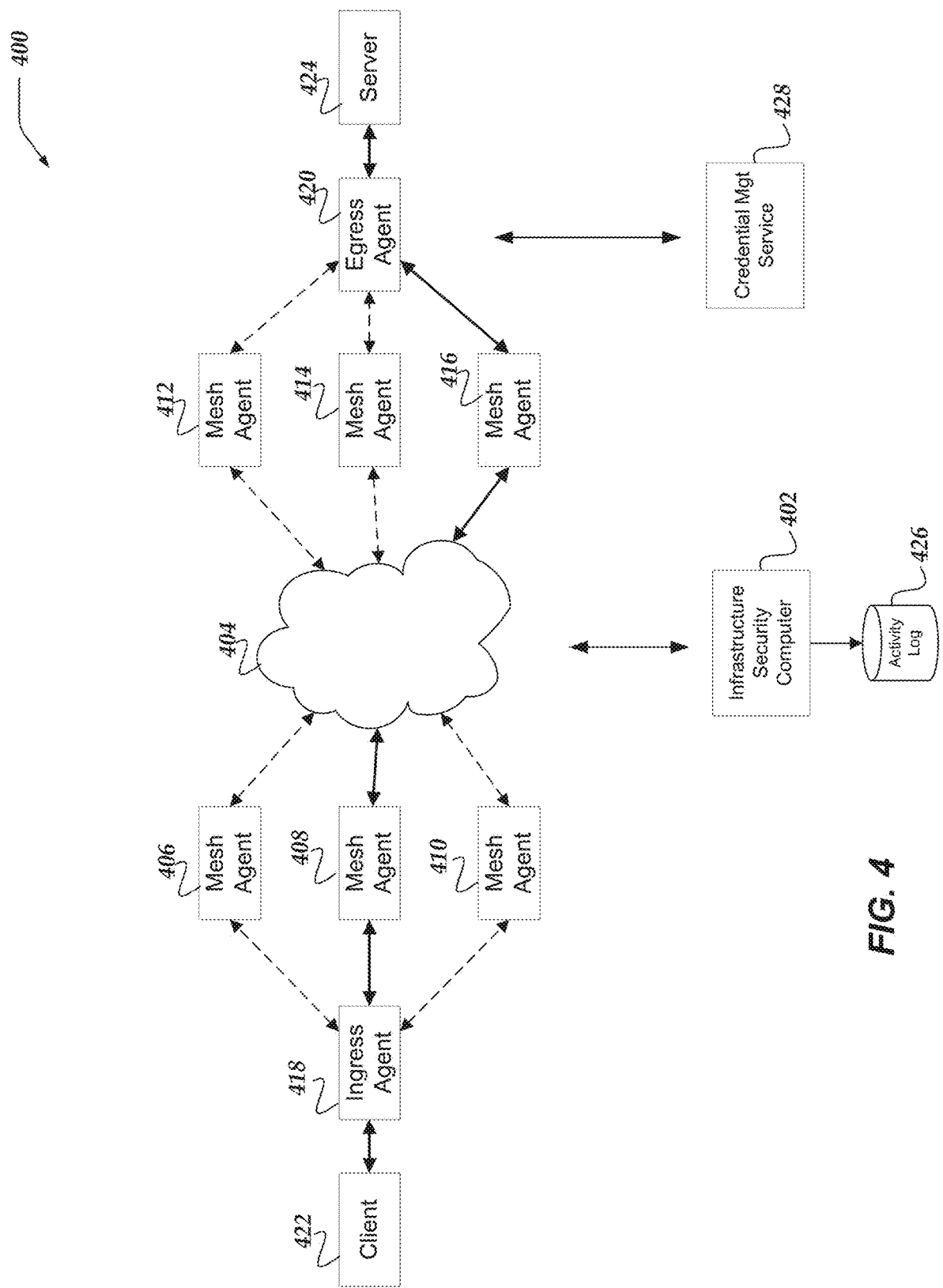
FIG. 4 illustrates a logical architecture of a system for managing and monitoring endpoint activity in secured networks in accordance with one or more of the various embodiments.

FIG. 4 illustrates a logical architecture of system 400 for managing and monitoring endpoint activity in secured networks in accordance with one or more of the various embodiments. In some embodiments, system 400 may comprise: one or more infrastructure security computers, such as, infrastructure security computer 402; one or more networks, such as, network 404; one or more mesh agents, such as, mesh agents 406-410 or mesh agents 412-416; one or more edge agents, such as, ingress agent 418 or egress agent 420; one or more clients, such as, client 422 or client 424; one or more activity log data stores, such as, activity log 426; one or more credential management services, such as, credential management service 428, or the like.

Note, one or more portions of system 400 illustrates a non-limiting example of a software defined network system or overlay network system. One of ordinary skill in the art will appreciate that other mesh network architectures or overlay network management schemes may be employed without departing from the scope of the innovations disclosed herein. However, the description of system 400 is sufficient for enabling one of ordinary skill in the art to understand the innovations disclosed herein.

In one or more of the various embodiments, mesh agents may be arranged to provide a software-defined overlay network that runs on one or more conventionally configured/provisioned physical (underlay) networks. In some embodiments, if a client application attempts to access resources managed by an infrastructure security service, the mesh agent used by clients to gain access to resources in a managed environment may be considered an ingress agent. Similarly, mesh agents that enable resource servers to respond to client request via the overlay network may be considered to be egress agents. Accordingly, in some cases mesh agents may be considered to be ingress agents in some contexts and they may be considered to be egress agents in other contexts. The different nomenclature is used herein as a convenience to describe features of embodiments in the different contexts.

In one or more of the various embodiments, infrastructure security computers, such as, infrastructure security computer 402, may host one or more infrastructure security engines that enforce a secure overlay network that provides managed access to one or more resources (or endpoints) in an networked environment.

In one or more of the various embodiments, if a client employs an mesh agent, such as, ingress agent 418, the ingress agent may be arranged communicate with infrastructure security computer 402 to authenticate the client request and determine a network path from the client to the target resource server via the overlay network.

In one or more of the various embodiments, mesh agents may be arranged to determine a next 'hop' to a next mesh agent. Accordingly, the next mesh agent, as well as, other mesh agents, may determine the next hop to a next mesh agent. Eventually, in some embodiments, the communication or request may reach an egress agent for the target resource server. And, in some embodiments, if each intervening mesh agent validates or authenticates the client communication, the client communication may reach the intended target resource server.

In one or more of the various embodiments, if an ingress agent receives a client request, the ingress agent may send a communication to an infrastructure security computer, such as, infrastructure security computer 402 to determine one or more authorized routes through the overlay network to reach the target resource server. In some embodiments, routes through the overlay network may be considered to be overlay paths that go from mesh agent-to-mesh agent until the target server may be reached.

In one or more of the various embodiments, mesh agents may establish a cryptographically secure virtual network tunnel between clients and servers such that the client/server traffic may be opaque to observers or other network devices that may be unaffiliated with the infrastructure security computer.

Note, one of ordinary skill in the art will appreciate that system 400 may comprise one or more network devices, network computers, routers, switches, or the like, that comprise the underlay network. For brevity and clarity, the underlay network components are omitted from FIG. 4.

In one or more of the various embodiments, mesh agents may be considered to be hosted on physical or virtual computers that have access to the underlay networks. Also, in some embodiments, the number of overlay network hops (between/via mesh agents) between endpoints may be different than the actual network hops required by the underlay network. For example, for some embodiments, system 400 shows one overlay hop to get from ingress agent 418 to mesh agent 408. However, in some cases, there may be multiple hops in the underlay network (not shown) to exchange network traffic between ingress agent 418 and mesh agent 408. For example, in some embodiments, one hop in the overlay network may traverse one or more sub-networks that may require multiple hops through multiple underlay network routers.

In one or more of the various embodiments, if a client provides a request to communicate with a managed endpoint (e.g., resource server 424), the corresponding ingress agent (e.g., ingress agent 418) forwards information about the request to an infrastructure security computer (e.g., infrastructure security computer 402). Accordingly, in some embodiments, an infrastructure security engine (hosted on the infrastructure security computer) may be arranged to determine if the client user has permission to communicate with the target endpoint. Also, in some embodiments, the infrastructure security engine may be arranged to determine one or more next mesh agents where the ingress agent may forward the client request. Accordingly, in some embodiments, infrastructure security engines may be arranged to generate an overlay route table that includes one or more available mesh agents that may be candidates that may be suitable and authorized for handling the communication.

In some embodiments, as client the communication may be forwarded to subsequent mesh agents, each intervening mesh agent may be arranged to validate and authenticate the client communication using the infrastructure security engine. In some embodiments, if the client communication may be authorized, the infrastructure security engine may provide an overlay route table that identifies one or more mesh agents for the next hop through the overlay network.

In this example, the overlay path determined for client 422 to communicate with server 424 is ingress client 418 to mesh agent 408 to mesh agent 416 to egress agent 420 and ultimately to server 424. At the final mesh agent (e.g., egress agent 420), the egress agent may determine/obtain the credentials that enable access to the server. In some embodiments, egress agents may be arranged to communicate with an infrastructure security computer to obtain credentials for a server. In this example, the connections (double-arrow lines) illustrated with solid lines represent the determined route through the overlay network. In contrast, the connections (double-arrow lines) illustrated using dashed lines represent mesh agents that may be part of the overlay network that were not selected for a particular communication between client 422 and server 424.

In one or more of the various embodiments, ingress agents, egress agents, or mesh agents may be configured to capture or record activity that may associated with the communication through the secure tunnel. In this example, for some embodiments, activity log data store 426 represents a data store for storing logged or recorded activity for a managed infrastructure. In some embodiments, infrastructure security engines may be arranged to enable different types of activity logging. In some embodiments, infrastructure security engines may be configured to record one or more of the user information associated with an action, occurrence of actions, the accompanying application payload (if any), response from servers, or the like. Further, in some embodiments, infrastructure security engines may enable log information to be forwarded to another data store for storage or archival.

In one or more of the various embodiments, infrastructure security engines may be arranged to generate authenticity tokens that may act as a fingerprint for activity that may occur during the secure tunnel session. In one or more of the various embodiments, authenticity tokens may be generated based on the payload content, user identities, client identities, or the like, that may be associated with an overlay session. For example, if the secure tunnel session includes a response to a query, the authenticity token may be generated based on a hash of the response to the query. Among other things, in some embodiments, authenticity tokens may be employed as part of a scheme to determine the authenticity activity log information that may be stored elsewhere.

Also, in one or more of the various embodiments, egress agents, such as, egress agent 420 may be enabled to access resource servers or other services using credentials that may be provided from a credential management service, such as, credential management service 428. Accordingly, in some embodiments, infrastructure security computers, such as, infrastructure security computer 402 may be enabled to provide credential instructions to egress agents that require credentials to access target resources. In some embodiments, egress agents may be arranged to request or otherwise obtain credential instructions from infrastructure security computers. In some embodiments, the credential instructions may be acted upon by egress agents to enable access to protected target resources. Note, in some embodiments, credential instructions may dictate the one or more actions an egress agent may perform to obtain or utilize credentials that enable the egress agent to access protected resources. In some embodiments, the credential instructions may enable egress agents to activate or authenticate a client application that interacts with the target resource.

Further, in some embodiments, one or more portions of application protocol information forwarded from client 422 or ingress agent 418 may be incorporated with credential instructions to enable access to target resource servers.

Note, in some embodiments, innovations disclosed herein may be employed with different overlay networks or in different network environments. System 400 is disclosed to provide context for the claimed innovations.

Figure 5:
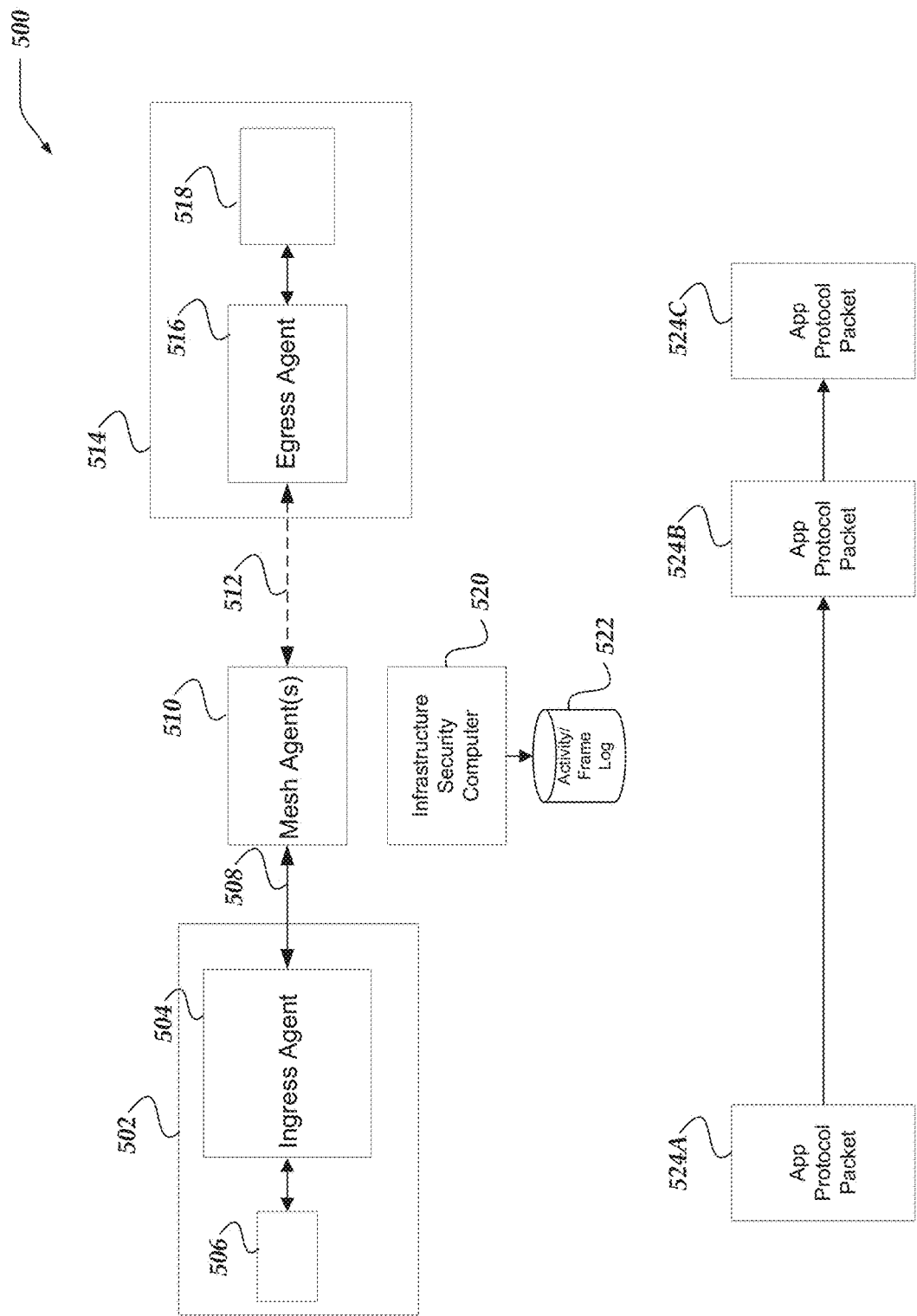
FIG. 5 illustrates a logical schematic of a system for managing and monitoring endpoint activity in secured networks.

FIG. 5 illustrates a logical schematic of system 500 for managing and monitoring endpoint activity in secured networks in accordance with one or more of the various embodiments. in this example, for some embodiments, system 500 includes client computer 502, ingress agent 504, client application 506, mesh agent(s) 510, target resource computer 514, egress agent 516, resource server 518, infrastructure security server 520, log data store 522. Note, in some embodiments, ingress agents may be considered mesh agents that a client application employs to communicate via an overlay network. Similarly, in some embodiments, egress agents may be considered mesh agents that communicate with server applications. Note, as mentioned above, ingress agents and egress agents may be considered mesh agents that may provide ingress or egress of traffic in the overlay network. Thus, for brevity and clarity mesh agents may be referred to as ingress agents, egress agents, or mesh agents depending on their immediate role in an overlay communication session.

In this example, for some embodiments, network path 508 may represent communication over a single overlay network hop of a secure tunnel that may comprise one or more underlay network hops to reach the computer that is hosting mesh agent 510. Likewise, network path 512 may represent one or more overlay network hops (intervening mesh agents not shown) that reach target computer 514 and egress agent 516.

As described above, in some embodiments, mesh agents may be arranged to communicate with infrastructure security engines that may be hosted on infrastructure security computers, such as, infrastructure security computer 520. Also, in some embodiments, infrastructure security engines may be arranged to log overlay session activity into activity log data store 522.

In one or more of the various embodiments, client applications, such as, client application 506 may employ one or more application protocols to communicate with resource servers, such as, resource server 518. In some embodiments, application protocols may define particular data in particular arrangements or sequences that enable client applications to communicate with associated/related server applications. In some embodiments, two or more applications or services may share the same application protocol. Also, in some embodiments, one or more applications may employ unique or custom protocols to enable communication between clients or servers. In some embodiments, servers may provide one or more APIs or interfaces that enable applications to access the servers rather than requiring dedicated/proprietary client applications. In such circumstances, a program or service configured to employ such APIs or interfaces may be considered a client application.

In some embodiments, application protocol packets originating from client applications may be provided to ingress agents and subsequently forwarded through the overlay network until they reach the egress agent. Accordingly, in some embodiments, egress agents may be arranged to act as an endpoint to the connection from the client application.

In this example, for some embodiments, application protocol packet 524A represents one or more packets of network traffic that may be sent from a client application, such as, client application 506. Accordingly, the application protocol packet may be routed through the overlay network until it reaches its egress agent. In this example, application protocol packet 524B represents the application protocol packet at the egress agent for the client request. And, in this example, for some embodiments, application protocol packet represents application protocol packets sent from an egress agent to the target resource server.

In one or more of the various embodiments, egress agents may be arranged to re-write application protocol packets to enforce one or more requirements or one or more features of the overlay network. For example, if an application protocol defines one or more fields for holding credential information, egress agents may be arranged to insert the appropriate credential information into the application protocol packets before communicating them to the target resource server. Thus, in some embodiments, credential information provided by the client (if any) may be automatically replaced by other credential information determined by the egress agent.

Accordingly, in some embodiments, egress agents may be arranged to communicate with infrastructure security computers to obtain credential instructions that declare one or more actions the egress agent may perform to obtain or activate credential information to access the target resource server. In some embodiments, egress agents may be arranged to replace the credential information included in application protocol packet 524B (if any) with credential information determined based on credential instructions provided by its associated infrastructure security computer. Further, in some embodiments, egress agents may be arranged to perform one or more 'fix-up' operations on application protocol packet 524B, such as, computing hash signatures based on packet content, adjusting packet size field values, adjusting sequence numbers, adjusting packet offset/pointer values (e.g., values that point to the location of particular values or sections in a given packet), or the like. Accordingly, in some embodiments, application protocol packet 524C represent a modified packet that includes credential information as well as other packet modifications that may be required for a particular application protocol or credential mechanism.

Figure 6:
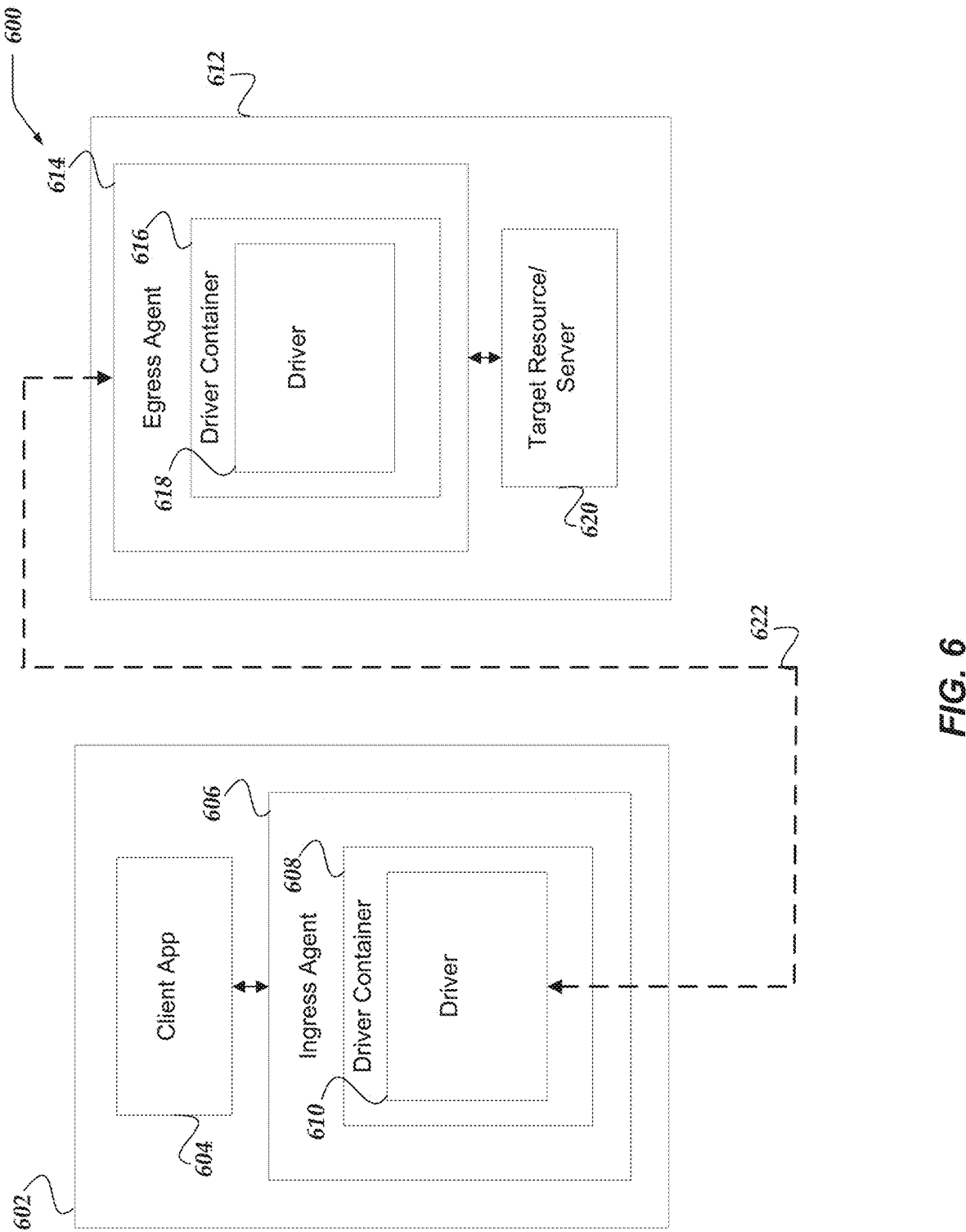
FIG. 6 illustrates a logical schematic of a system for managing and monitoring endpoint activity in secured networks in accordance with one or more of the various embodiments.

FIG. 6 illustrates a logical schematic of system 600 for managing and monitoring endpoint activity in secured networks in accordance with one or more of the various embodiments. In some embodiments, systems, such as, system 600 may include client computer 602, client application 604, ingress agent 606, (client) driver container 608, (client) driver 610, network computer 612, egress agent 614, (server) driver container 616, (server) driver 618, target resource server 620, or the like. Further, in this example, path 622 represents a network connection between client computer 602 and network computer 612 as facilitated by ingress agent 606 and egress agent 614.

As described above, in one or more of the various embodiments, ingress agents and egress agents may be arranged to establish a secure network path between a client application, such as, client application 604 and target resources, such as, target resource 620.

As described above, mesh agents, such as, ingress agents or egress agents may be enabled to inspect or modify network traffic exchanged between client applications and protected target resources. Accordingly, in some embodiments, mesh agents may be arranged to employ driver containers or drivers that include application protocol models, rules, instructions, parsers, grammars, or the like, directed to one or more application protocols that particular client applications and target resources may employ to communicate.

In one or more of the various embodiments, particular drivers for particular application protocols may be included in driver containers, such as, driver container 608 and driver container 612. In some embodiments, driver containers may be arranged to declare one or more configuration parameters that may be consistent with a particular network or overlay network that may be hosting the mesh agents. Accordingly, in some embodiments, parameters in a driver container may set that conform the operation of the driver or mesh agent to one or more policies that may be enforced by an overlay network or infrastructure security computer.

Also, in one or more of the various embodiments, drivers, such as, driver 610 or driver 618 may comprise various instructions for establishing sessions (e.g., handshakes), interpreting application protocol traffic, logging user/server activity, modifying application protocol traffic, error handling, actions to finalize a session, or the like. In some embodiments, the arrangement of the internal operations of a given driver may be directed to a particular target resources. For example, in some embodiments, different drivers be arranged to support different target resources that may employ different application protocols, support different types of interactions with users/clients, require specific error handling, or the like. Thus, for example, drivers.

Also, in some embodiments, ingress agents or egress agents may be arranged to dynamically load or activate different drivers depending on the particular client application, target resource, application protocol, or the like. Also, in some embodiments, different ingress/egress agents may be provided for different client applications, target resources, application protocols, or the like.

Figure 7:
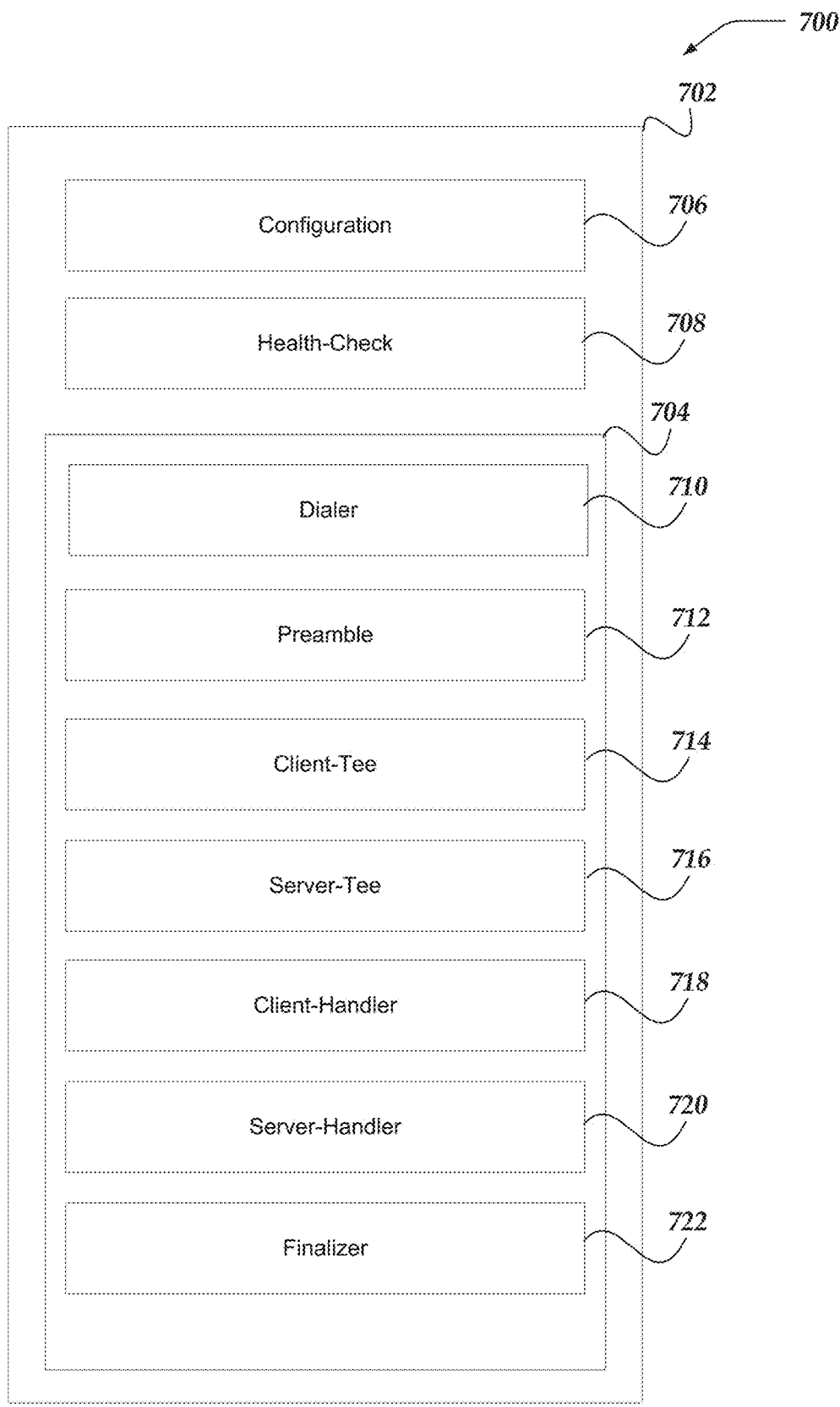
FIG. 7 illustrates a logical schematic of a driver system for managing and monitoring endpoint activity in secured networks in accordance with one or more of the various embodiments.

FIG. 7 illustrates a logical schematic of driver system 700 for managing and monitoring endpoint activity in secured networks in accordance with one or more of the various embodiments. As described above, ingress agents or egress agents may employ driver systems to interpret application protocols, interact with client applications, interact with target resources, or the like. In some embodiments, driver systems, such as, driver system 700 may include driver containers, such as, driver container 702. In some embodiments, driver containers may include various modules, such as: configuration parameters, such as, configuration parameters 706; health check modules, such as, health check module 708; drivers, such as, driver 704; or the like.

In one or more of the various embodiments, drivers, such as, driver 704 may include various driver modules, such as, dialer module 710, preamble module 712, client-tee module 714, server-tee module 716, client-handler module 718, server-handler module 720, finalizer module 722; or the like.

In one or more of the various embodiments, configuration parameters, such as, configuration parameters 706 may include parameters and parameter values that may configure a driver to conform with the configuration, policies, or the like, for a particular overlay network or networking environment. Also, in some embodiments, configuration parameters may include information for user interface configuration, labeling, localization, form field labels, form field identifiers, or the like. Also, in some embodiments, configuration parameters internal identifiers associated with the mesh agent, such as, a username for the mesh agent. Also, in some embodiments, other configuration parameters may include information related how credentials may be obtained for accessing target resources. Also, in some embodiments, configuration parameters may include one or more configuration parameters directed to a specific target resource or client application, such as, flags, database aliases, startup/launch parameters, or the like. For example, in some embodiments, configuration parameters may declare one or more flags that may be passed to target resources by egress agents or passed to client applications by ingress agents. Accordingly, in some embodiments, ingress agents or egress agents may be enabled to pass particular startup/launch parameters to client applications or target resource without requiring user intervention. Likewise, in some embodiments, configuration parameters may enable ingress agents or egress agents to launch client applications or target resources with parameters that may be hidden from users. For example, in some embodiments, configuration parameters may enable a target resource database to be launched in a cluster mode rather than being launched in single server-mode without the user knowing.

In one or more of the various embodiments, health-check modules, such as, health-check module 708 may be arranged to execute one or more actions that verify the installation or operation of a target resource or client application. In some embodiments, the particular actions executed by a health-check model may vary depending on the client applications or target resources associated with the driver system. In some embodiments, health-check module may be arranged to execute round-trip operations that may verify the excepted/required operation of a target resource. For example, in some embodiments, a health-check model for a database target source may include explicit steps for connecting with the database, sending a query, receiving an expected response, or the like.

Further, in some embodiments, health-checks may be initiated by infrastructure security computers, or the like, by communicating a health-check command to the ingress agent or egress agent and reporting the result.

In one or more of the various embodiments, driver system specific implementations may be provided to proves the correctness of the configuration or installation of driver and its associated target resource or client application.

Accordingly, in some embodiments, health-check module 708 may be arranged to start driver 704 and make a call to an associated target resource through driver 704 and confirms the success of the call.

In some embodiments, successful result of a health-check may confirm that the credentials or other configuration parameters may be correct and that the target resource or client application are responsive to commands. Note, in some embodiments, health-check modules may provide application level tests, thus, the specific instructions or actions executed by a given health-check module may be different for different driver systems.

Further, in some embodiments, infrastructure security computers may be arranged to periodically issue health-check commands for different egress agent, target resources, client applications, or the like, based on configuration information to account for local requirements or local circumstances. Also, in some embodiments, infrastructure security computer may be arranged to provide one or more user interfaces that enable administrators to deliberately initiate health checks on demand.

Also, in some embodiments, infrastructure security computers, or the like, may be arranged to automatically initiate health-checks depending on various policies. For example, in some embodiments, a policy may be declared that automatically triggers health-checks if new resource or applications may be enabled to be part of a managed network or overlay network. In some embodiments, policy configuration may determine which egress agents or ingress agents (e.g., which driver systems) may execute health-checks in response to various changes or circumstances. For example, if a new target resource is added to a managed network or overlay network, infrastructure security computer policy may determine that a portion of the egress agents that may access the new target resource may perform a health-check. Thus, in some embodiments, health-check policies may be determined to avoid flooding an network or target resource too many health-checks at the same time.

In one or more of the various embodiments, drivers, such as, driver 704 may be arranged to include various modules that may be directed to duties or functions of the drivers. In some embodiments, drivers or driver systems for different types of client applications, application protocols, server applications, target resources, or the like, may be arranged to provide a consistent API based on the different driver modules. In some embodiments, driver modules may enable resource/application specific actions or instructions to encapsulated while providing the consistent interface that may be expected by mesh agents.

Also, in some embodiments, drivers may be arranged to include a dialer module, such as, dialer module 710. In some embodiments, dialer modules may be arranged to execute one or more actions that may establish a connection with a target resource. Accordingly, in some embodiments, dialer modules may be arranged to perform communication protocol handshakes, or the like, to establish a connection to the target resource. In some cases, for some embodiments, a particular target resource may require two or more connections. For example, in some cases, target resource may require different read or write connections, control connections, data connections, or the like. Accordingly, in some embodiments, if needed, dialer modules may be arranged to one or more connections. In this context, a connection may often be a network connection, such as, a TCP/IP connection, network socket, or the like. However, in some embodiments, for some cases, connections may include pipes, shared memory, file handlers, or the like, depending on the requirements of a particular target resource. In some embodiments, connection configuration parameter values, such as, protocol, port, may be obtained from the configuration parameters stored in an associated driver container. Also, in some embodiments, connection configuration parameter value may be determined by the dialer module itself. Note, in some embodiments, establishing a connection, establishes a communication protocol connection rather than initiating an application level session.

In one or more of the various embodiments, drivers may be arranged to include a preamble module, such as, preamble module 712. In some embodiments, preamble modules may be arranged to conduct the actions to establish an application "session" with a target resource. In some cases, such actions may be considered performing a protocol handshake, or the like, that enables the driver (and its associated mesh agent) to establish an application level with a target resource.

In some embodiments, the particular actions performed by a particular preamble module may vary depending on the application protocol, target resource client application, or the like. In some embodiments, preamble APIs may include parameter fields for providing credential information for authenticating the mesh agent/driver with the target resource (for egress agents) or client applications (for ingress agents). Note, in some embodiments, mesh agents may be arranged to determine credentials or credential instructions for obtaining credentials prior to establishing a session with a target resource.

In some embodiments, drivers may be arranged to include a client-tee module, such as, client-tee module 714. In some embodiments, client-tee modules may be arranged to enable the driver to intercept network traffic associated with a session. Accordingly, in some embodiments, client-tee modules may be arranged to perform actions for intercepting traffic that may be coming from the client application via an ingress agent and overlay network. Also, in some embodiments, client-tee modules may be arranged to provide a copy of the traffic from the client to the client-handler module for the driver.

Also, in some embodiments, drivers may be arranged to include a server-tee module, such as, server-tee module 716. In some embodiments, server-tee modules may be arranged to intercept traffic coming from the target resource. In some embodiments, the traffic intercepted by the service-tee may be modified and then forwarded to the client application/ingress agent that has initiated the application session. Further, in some embodiments, server-tee modules may be arranged to provide a read-only unmodified copy of the communication traffic provided by the target resource to a server-handler module.

Also, in some embodiments, drivers may be arranged to include a client-handler module, such as, client-handler module 718. As described above, in some embodiments, client-handler modules may be arranged to be provided communication coming from the client application (via the overlay network and ingress agent). In some embodiments, the client-handler module may be arranged to include instructions, or the like, for interpreting the communication (e.g., evaluating the application protocol) from the client application.

Furthermore, in some embodiments, client-handler modules may be arranged to perform actions to record/log the activity associated with an application session. In some embodiments, two or more different types of logging may be performed. In some embodiments, client-handler modules may be arranged to record activity to a request/query log. Accordingly, in some embodiments, information associated with individual client request communications/message may be logged. For example, if a client application submits a database query to a target resource database, the client-handle may record the query string as it is has provided by the client application over the overlay network. Also, in some embodiments, driver may be arranged to identify 'frames' of activity that may comprise or be based on one or more individual commands. In some embodiments, the definition of the scope of a frame of activity may vary depending on the particular applications or servers. In some embodiments, frames may include several exchanges of message that may be grouped together to provide the surrounding context or an overall picture of how two or more requests or responses may be related to each other. In some embodiments, a frame of activity may correspond to 'screen' of activity such that the amount of client messages that could be displayed on a terminal screen may define the extents of a frame. In some cases, for some embodiments, frames may group commands or messages into time buckets. Also, in some embodiments, a beginning of a frame may be defined by the issuance of a application level 'start' command and the end of a the frame may be determined by the issuance of a 'stop' where the particular start/stop commands may be relevant to the particular application. For example, in some embodiments, if the target resource is a data base, a frame may be defined by 'begin' and 'commit' commands. Thus, in this example, the client-handler may be configured open a frame if a 'begin' command is observed and then close the frame if a 'commit' command may be observed.

Also, in some embodiments, drivers may be arranged to include a server-handler module, such as, server-handler module 720. In some embodiments, server-handler modules may be arranged to receive the traffic the target resource may be sending in response to client requests. In some embodiments, server-handler modules may be arranged to include instructions, or the like, for interpreting the communication (e.g., evaluating the application protocol) sent from the target resource to the egress agent.

Also, in some embodiments, similar to client-handlers described above, server-handlers may be arranged to log traffic from the target resource at the message or action level as well as log frames of activity that may be associated with an application session.

Also, in some embodiments, drivers may be arranged to include a finalizer module, such as finalizer module 722. In some embodiments, finalizer modules may be arranged to execute one or more actions to clean-up an application session. Accordingly, in some embodiments, finalizer modules may be arranged to perform actions to delete or remove artifacts that may be associated with an application session, such as, temporary files, open resource handler (e.g, file handles), or the like. In some embodiments, the particular actions performed by a finalizer module may depend on the particular target resource, client application, user activity, or the like. Also, in some cases, for some embodiments, finalizer modules may be arranged to perform no operations.

Figure 8:
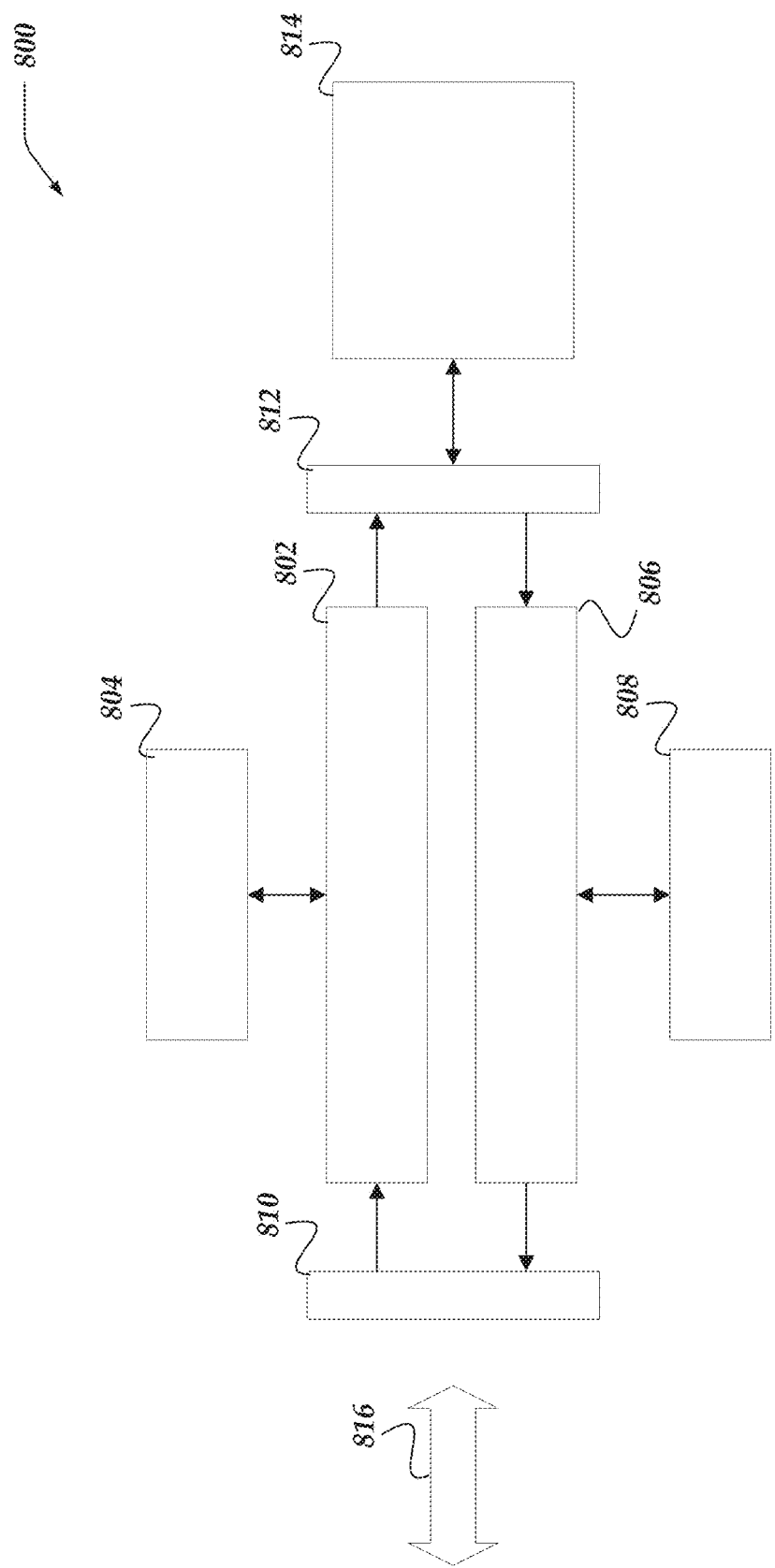
FIG. 8 illustrates a logical schematic of a system representing how egress agents or ingress agents with a driver system may provide for managing and monitoring endpoint activity in secured networks in accordance with one or more of the various embodiments.

FIG. 8 illustrates a logical schematic of system 800 for representing how egress agents or ingress agent with a driver system may provide for managing and monitoring endpoint activity in secured networks in accordance with one or more of the various embodiments.

In some embodiments, systems, such as, system 800 may include, client-tee module 802, client-handler module 804, server-handler module 806, server-handler module 808, ingress connection 810, egress connection 812, target resource 814, overlay network path 816, or the like.

In one or more of the various embodiments, overlay network path 816 may represent a path through a managed network or overlay network that may be considered to lead to an ingress agent that may be associated with a client application.

In one or more of the various embodiments, ingress connection 810 represents communication protocol connection that leads to the associated ingress agent/client application participating in an application session.

In one or more of the various embodiments, egress connection 812 represents communication protocol connection that connect the egress agent/driver system to the associated target resource. In some embodiments, if the egress agent and the target resource may be hosted on the computer, connection 812 may be local network connection, or the like. Also, in some embodiments, if the egress agent and the target resource may be hosted on different computers, connection 812 may be a conventional network connection. Note, in some embodiments, connections, such as, connection 810 or connection 812 may include encryption features, or the like, provided by the communication protocol (e.g., SSH tunnels) or the overlay network.

In one or more of the various embodiments, communication traffic associated with a client application and provided by an ingress agent may be communicated to system 800 over path 816 and arriving at connection 810. Accordingly, In some embodiments, incoming traffic from the ingress agent may be provided to client-tee module 802. In some embodiments, client-tee module 802 may be arranged to inspect or modify the traffic content and/or provide some or all of the client traffic to client-handler module 804.

Further, in some embodiments, client-tee module 802 may be arranged to provide the inspected or modified traffic to connection 812. Accordingly, in some embodiments, the inspected or modified traffic may be provided to the target resource as part of or in context with an on-going application session.

In one or more of the various embodiments, response traffic associated with an application session may be provided to connection 812 by target resource 814.

Accordingly, in some embodiments, response traffic from target resource 814 may be provided to server-tee module 806. In some embodiments, server-tee module 806 may be arranged to inspect or modify the response traffic. Also, in some embodiments, server-tee module 806 may be arranged to provide a copy of the original (e.g., unmodified) response traffic to server-handler module 808. Also, in some embodiments, server-tee module 806 may be arranged to forward inspected or modified response traffic to connection 810 enabling overlay network path 816 to forward the response traffic to the ingress agent associated with client application.

As described above, in some embodiments, client-handler modules, such as, client-handler module 804 may be arranged to perform various actions, including request/query logging, frame logging, or the like. Likewise, as described above, in some embodiments, server-handler modules, such as, server-handler module 808 may be arranged to perform various actions, including response message logging, frame logging, or the like.

Note, in some embodiments, a system similar to system 800 may be executing on ingress agents, except the client application may be connected directly to the ingress agent and the egress agent may be connection remotely via the overlay network path. Thus, for brevity and clarity a detailed description of a system similar to system 800 but on an ingress agent is omitted.

Further, in some embodiments, ingress agents may be arranged to provide a network endpoint for the client application and a separate endpoint that connects the overlay network. Similarly, in some embodiments, egress agent may be arranged to provide an network endpoint the connects to the overlay network and another endpoint that connects to the target resource.

Also, in some embodiments, driver systems may provide client-tee and server-tee modules for providing the network endpoints. Accordingly, in some embodiments, client-tee modules may be arranged to provide the endpoint that receives network traffic that originates from the client application and another endpoint that may employed to forward the client application traffic to the overlay network for providing to the target resource.

Similarly, in some embodiments, server-tee modules may be arranged to provide the endpoint that receives network traffic originating from the target resource and an endpoint that enables the network traffic originating from the target resource to be forwarded to the client application via the overlay network.

In some embodiments, the allocation of responsibilities of ingress agents and egress agents may vary depending on the client application, target resource, or organization policy. For example, in some embodiments, in some cases, ingress agents may be configured to pass-through some or all client application traffic such that the egress agent associated with the target resource executes may be responsible for monitoring/managing the application session. Thus, for example, in some embodiments, if an application session may be established, the client-tee and server-tee at the egress agent may provide the monitoring or management of both sides of the application traffic.

Figure 9:
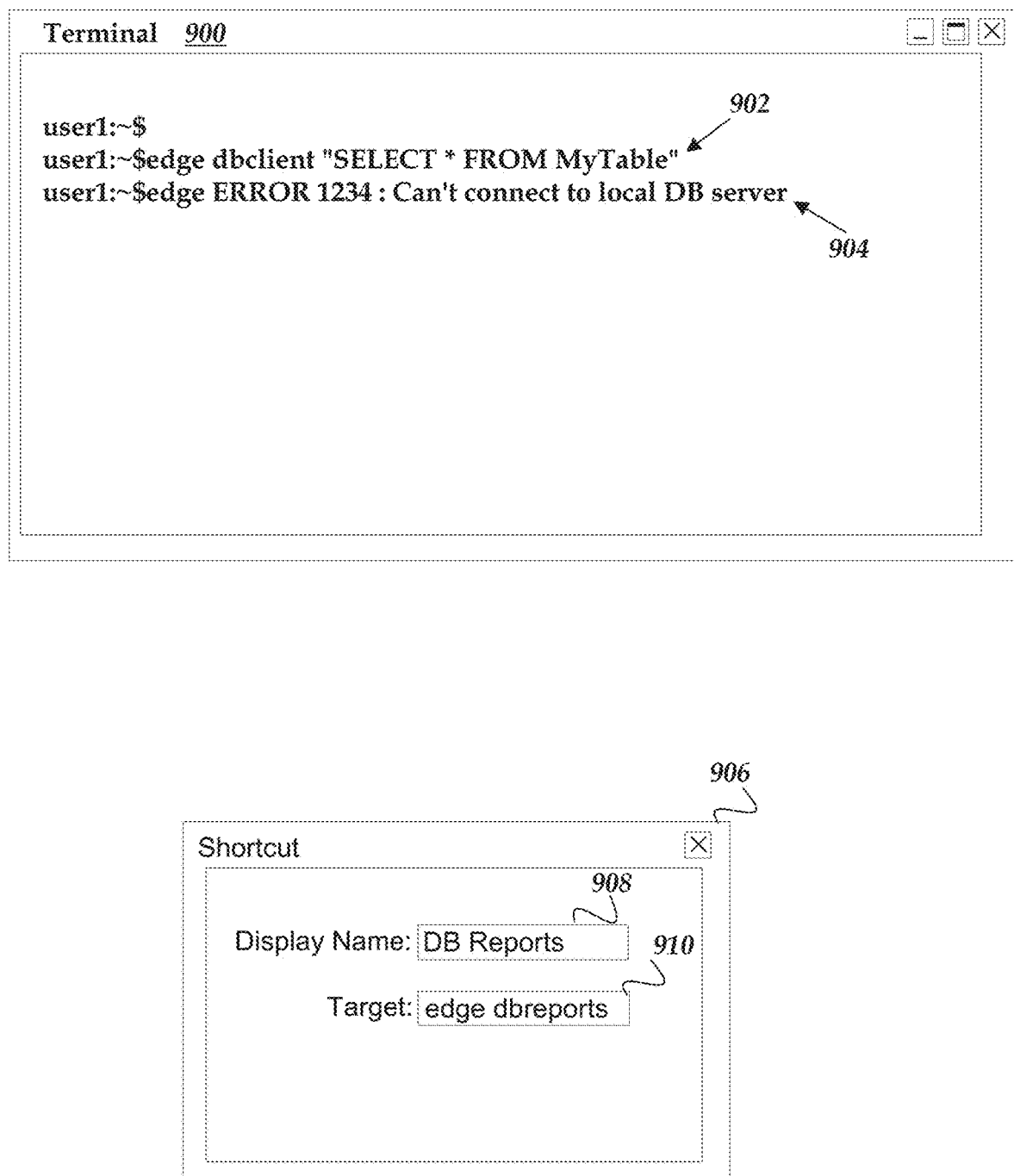
FIG. 9 illustrates a logical schematic of a terminal and a shortcut for managing and monitoring endpoint activity in secured networks in accordance with one or more of the various embodiments.

FIG. 9 illustrates a logical schematic of terminal 900 and shortcut 906 for managing and monitoring endpoint activity in secured networks in accordance with one or more of the various embodiments. In some embodiments, terminal 900 may represent a computer terminal application that enables users access to command-line interfaces for various applications. In this example, for some embodiments, command line 902 represents a command line that may be provided by a user. In this example, the user is attempting to retrieve data from a remote database using the program dbclient. In the example, the command 'dbclient' is shown as prefixed by the command 'edge'. Accordingly, in this example, the prefix represents a command to employ an ingress agent to execute the dbclient. Accordingly, in this example, rather than routing the dbclient command via the conventional underlay network, the ingress agent may capture the execution of dbclient and employ the overlay network to establish a secure tunnel for the requested operation.

Similarly, in some embodiments, shortcut 906 illustrates how a shortcut for a GUI based operating system or window manager may be configured to route commands initiated from a desktop (e.g., mouse-clicks) through secure tunnels in the overlay network. In this example, shortcut 906 includes an application display name, such as, display name 908 and a launch/execution command represented by target 910. Thus, in this example, shortcuts may be configured to enable launched applications to access the overlay network.

Note, often client applications may support users providing server identifiers (e.g., URIs, IP addresses, hostnames, or the like) that declare the server that for the client application. For example, a conventional command to launch a dbclient application may include the hostname where the database server of interest is located. However, for resources in the overlay network, the infrastructure security engines may determine the location of the server.

Figure 10:
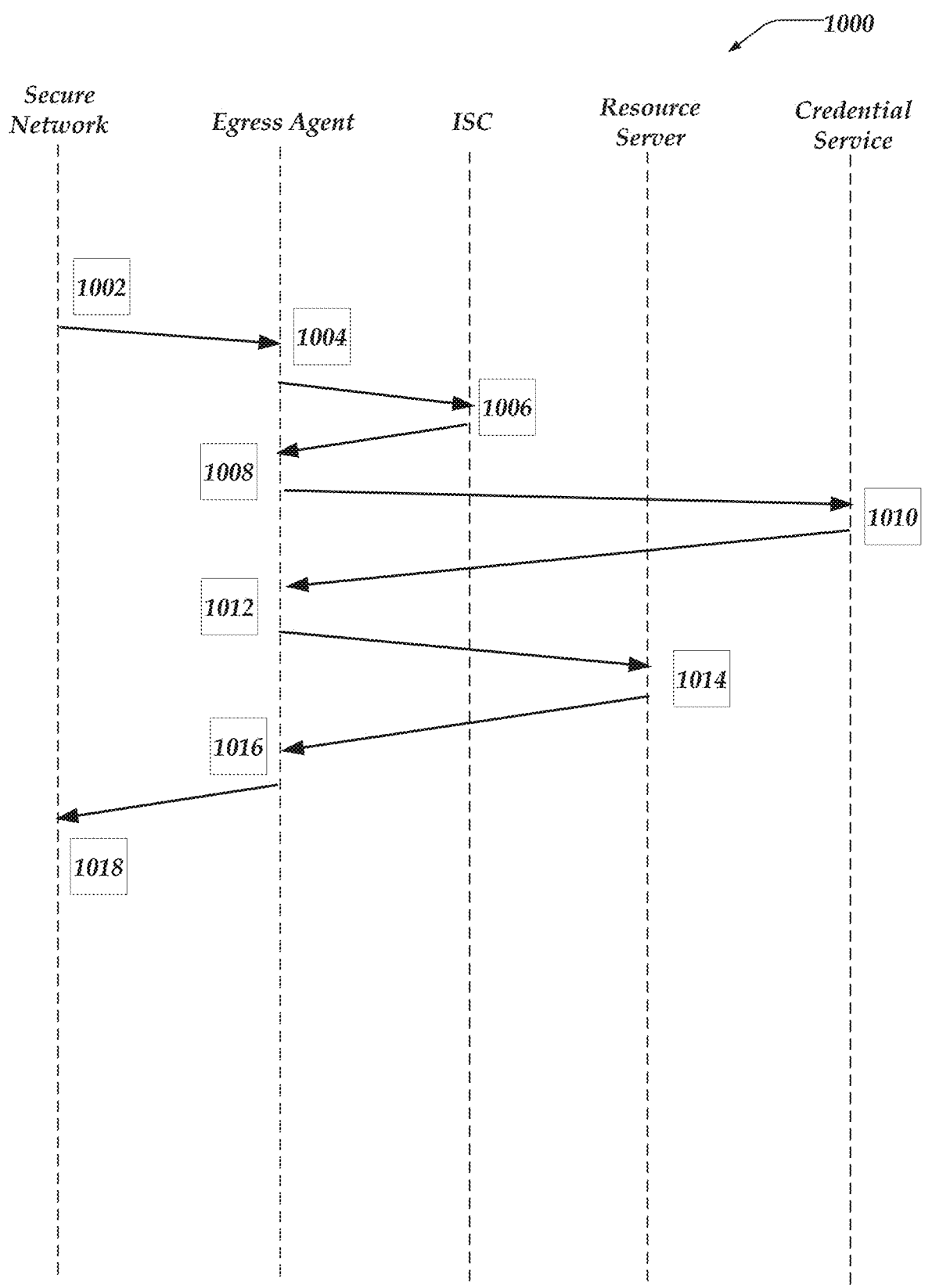
FIG. 10 illustrates a logical diagram of a sequence that may be considered representative of steps/actions for an overlay network in accordance with one or more of the various embodiments.

FIG. 10 illustrates a logical diagram of sequence 1000 that may be considered representative of steps/actions for an overlay network in accordance with one or more of the various embodiments.

In one or more of the various embodiments, sequence 1000 illustrates interactions between or among clients, servers, ingress agents, egress agents, infrastructure security engines, or the like. As described above, in some embodiments, ingress agents and egress agents may be mesh agents that are providing access to the overlay network for clients or services. Similarly, clients may be resources that are initiating a request directed to another resource and servers may be resources that may respond to a client request. Accordingly, resources may be clients or servers depending on their role at a particular moment.

At step 1002, in one or more of the various embodiments, a client request may be routed over a network directed to a particular egress agent that may be associated with a managed resource or service. (Services or resources may hereinafter be referred to collectively as resources or resource servers.) Also, resources that a client may be attempting to communicate with may be referred to as target resources or target resource servers. The client application, ingress agent, and one or more intervening mesh agents of the network are not shown here. The secure network may be comprised of one or more software-defined networks, overlay networks, mesh networks, or the like, that may be assumed to be configured to route a client request to an egress agent associated with a target resource.

As described above, managed resources may be accessible via mesh agents. Accordingly, in some embodiments, the mesh agent associated with the client may be considered the ingress agent that enables the client to gain access to the secure network. And, in some embodiments, the egress agent may be a mesh agent that may be configured to directly access the target resource server.

At step 1004, in one or more of the various embodiments, the client request may be provided to the egress agent. Accordingly, in some embodiments, similar to other mesh agents participating in the connection/session, the egress agent may be arranged to confirm that the client is authorized to access the target resource. Accordingly, in some embodiments, the egress agent may communicate with its infrastructure security computer to obtain confirmation that the client request is allowed to be provided to the target resource.

Also, in some embodiments, the egress agent may require credential instructions from the infrastructure security computer. As described above, egress agents may be arranged to follow the credential instructions to determine the credential information that enables the egress agent to access the target resource.

At step 1006, in one or more of the various embodiments, the infrastructure security computer may determine if the client can access the resource server. Also, in some embodiments, since this request is coming from the egress agent, the infrastructure security computer may be arranged to provide credential instructions for the resource server. As described above, credential instructions may declare one or more actions that may be performed by the egress agent to enable the egress agent to access the target resource rather than including credential secrets directly.

At step 1008, in one or more of the various embodiments, if the infrastructure security computer authenticates the user and the client request, the infrastructure security computer may provide credential instructions to the egress agent. Accordingly, in some embodiments, the egress agent may employ the credential instructions to determine the credential information that include user secrets that enable the egress agent to forward the client request to the resource server.

In this example, the egress agent may be arranged to follow the credential instructions to communicate with a credential management service to obtain the necessary credential information. Note, in some embodiments, egress agents may be arranged to employ one or more credential recipes that may include the particular instructions or locations for obtaining credential information from particular credential vaults or credential management services.

At step 1010, in one or more of the various embodiments, the credential service may provide credential information that the egress agent may employ to access the target resource. Note, in some embodiments, if the credential service rejects the request to obtain credential information, the client request may be declined, canceled, arrested, discarded, or the like, depending on the configuration of the secure overlay network.

At step 1012, in one or more of the various embodiments, the egress agent may employ the client request and the credential information to access the target resource. In some embodiments, the egress agent may modify application protocol packets provided by the client to include some or all of the credential information that may enable the client request to be accepted or otherwise processed by the target resource.

In some embodiments, egress agents may be arranged to store the credential information in a local temporary cache. Accordingly, in some embodiments, if subsequent access requests may require the same credential information, the cached credential information may be employed. In some embodiments, one or more cache policies may be associated with the credential information cache. In some embodiments, such policies may include ageing policies that automatically remove/delete credential information from the cache they are not used within a declared time duration. In some embodiments, egress agents may be configured to employ rules, instructions, or the like, provided via configuration information for determining cache policies to account for local circumstances or local requirements. Also, in one or more of the various embodiments, infrastructure security computers may provide cache policy directives with or along-side the credential information. Accordingly, in one or more of the various embodiments, different credential information may be associated with different cache policies. Thus, in some embodiments, administrators may establish different cache policies for different users, different resources, or the like.

Further, in some embodiments, infrastructure security engines may be arranged to direct egress agents (e.g., send a command message) to delete cached credential information should a user or session loses their privilege to access the target resource.

At step 1014, in one or more of the various embodiments, the resource server may receive the client request with credentials provided from the egress agent. Accordingly, in some embodiments, the resource server may process the client request. In one or more of the various embodiments, if the resource server provides a response, the response may be forwarded to the egress agent.

At step 1016, in one or more of the various embodiments, the egress agent may be arranged to forward the resource server response back through a secure tunnel in the overlay network towards the ingress agent that corresponds to the client. In some embodiments, the resource server response may be forwarded through one or more intervening mesh agents that were determined to establish the secure tunnel between the egress agent and the ingress agent rather than validating the resource server response with the infrastructure security computer at each mesh agent.

Accordingly, in one or more of the various embodiments, mesh agents may be arranged to employ the secure tunnel for the session without validating the client or secure tunnel with the infrastructure security computer based on the validation/authentication performed to establish the secure tunnel.

At step 1018, in one or more of the various embodiments, the overlay network may forward the server response to the ingress agent associated with the client. In some embodiments, that ingress agent may receive the server response via the overlay network and forward it to the client.

Figure 11:
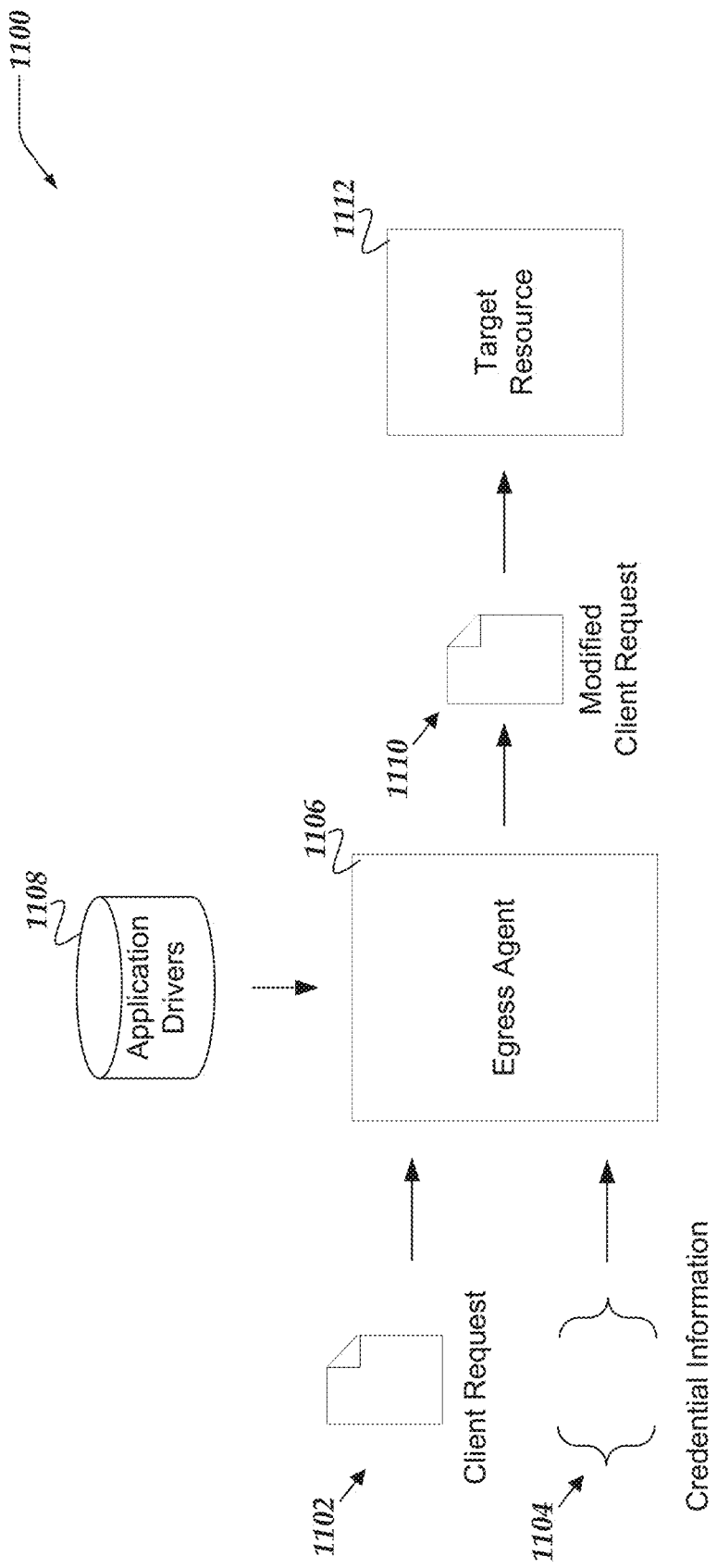
FIG. 11 illustrates a logical schematic of a system for credential management for distributed services in accordance with one or more of the various embodiments.

FIG. 11 illustrates a logical schematic of system 1100 for credential management for distributed services in accordance with one or more of the various embodiments. As described above, in some embodiments, client requests, such as, client request 1102 and credential information, such as, credential information 1104 may be provided to egress agents, such as, egress agent 1106. Accordingly, in some embodiments, egress agents may be arranged to employ one or more application driver, such as, application drivers 1108 to determine how to modify the original client request into a modified client request, such as, client request 1110. Thus, in some embodiments, the modified client request (which may include one or more credential secrets) to a target resource, such as, target resource 1112. Accordingly, in some embodiments, egress agents may enable the client request to be provided to the target resource without the client application (or ingress agent) accessing or holding the credential information.

In one or more of the various embodiments, different application protocols may require different modifications that are specific to the particular application protocol, client request, applications, or the like. Accordingly, in some embodiments, egress agents may be arranged to employ one or more application drivers, such as, application drivers 1108 that declare the particular modifications for particular applications or client requests. In some embodiments, application driver may provide an API that enables credential information value to be inserted into client requests.

Generalized Operations

FIGS. 12-19 represent generalized operations for managing and monitoring endpoint activity in secured networks in accordance with one or more of the various embodiments. In one or more of the various embodiments, processes 1200, 1300, 1400, 1500, 1600, 1700, 1800, and 1900 described in conjunction with FIGS. 12-19 may be implemented by or executed by one or more processors on a single network computer such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in a cloud-based or containerized environment. However, embodiments are not so limited and various combinations of network computers, client computers, or the like may be utilized. Further, in one or more of the various embodiments, the processes described in conjunction with FIGS. 12-19 may be used for managing and monitoring endpoint activity in secured networks in accordance with at least one of the various embodiments or architectures such as those described in conjunction with FIGS. 4-11 Further, in one or more of the various embodiments, some or all of the actions performed by processes 1200, 1300, 1400, 1500, 1600, 1700, 1800, and 1900 may be executed in part by overlay network engine 322, one or more mesh agents, such as, mesh agent 324, or the like, running on one or more processors of one or more network computers.

Figure 12:
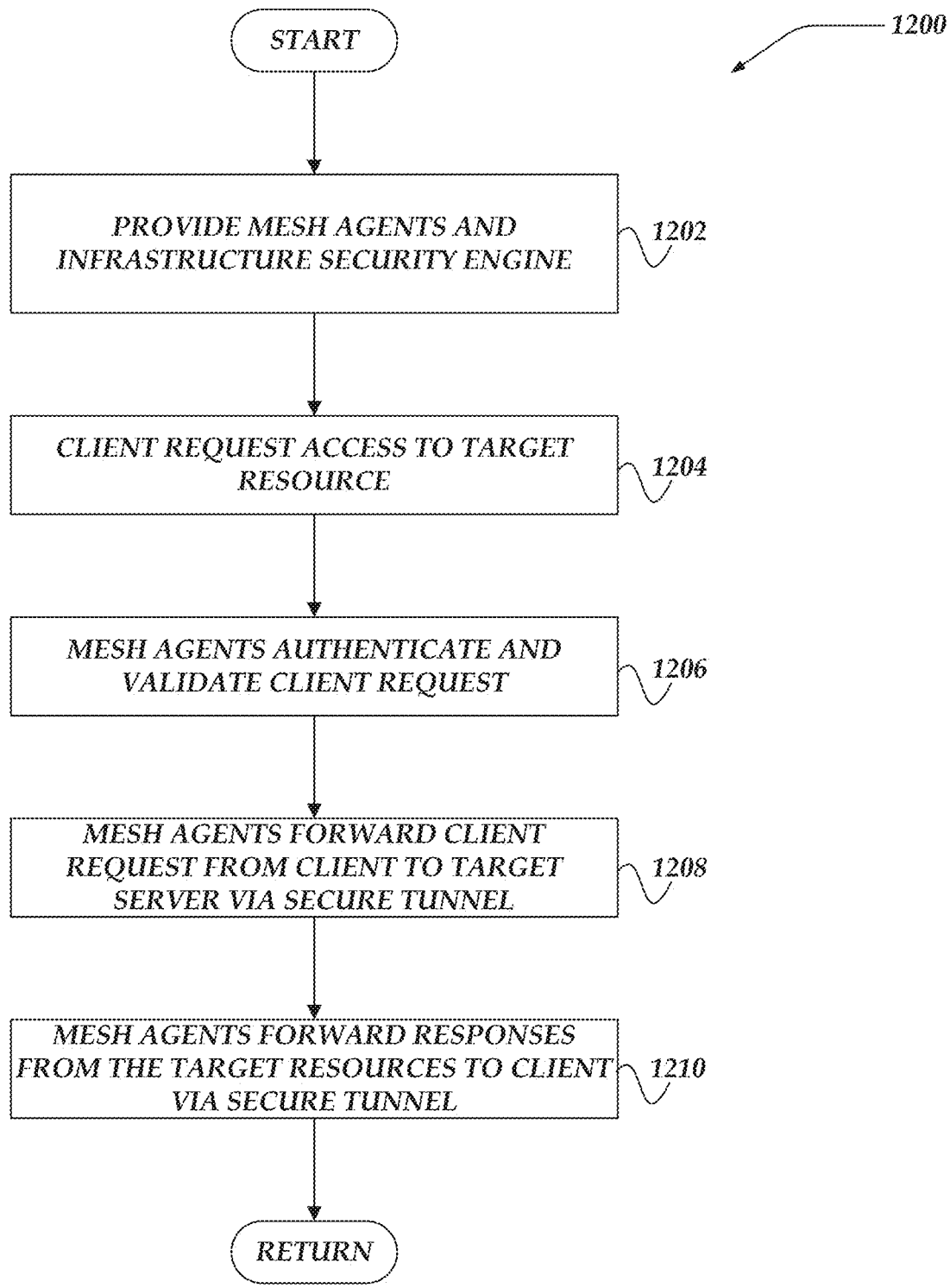
FIG. 12 illustrates an overview flowchart of a process for managing and monitoring endpoint activity in secured networks in accordance with one or more of the various embodiments.

FIG. 12 illustrates an overview flowchart of process 1200 for managing and monitoring endpoint activity in secured networks in accordance with one or more of the various embodiments. After a start block, at block 1202, in one or more of the various embodiments, one or more mesh agents and one or more infrastructure security engines may be provided. At block 1204, in one or more of the various embodiments, mesh agents may be provided a client request to access a target resource. At block 1206, in one or more of the various embodiments, mesh agents may be arranged to communicate with one or more infrastructure security engines to authenticate or validate the client requests. At block 1108, in one or more of the various embodiments, mesh agents may be arranged to forward validated/authenticated client requests to target resources via a secure tunnel in the overlay network. At block 1210, in some embodiments, mesh agents may be arranged to forward responses from the target resource to the client via the secure tunnel. Next, in one or more of the various embodiments, control may be returned to a calling process.

Figure 13:
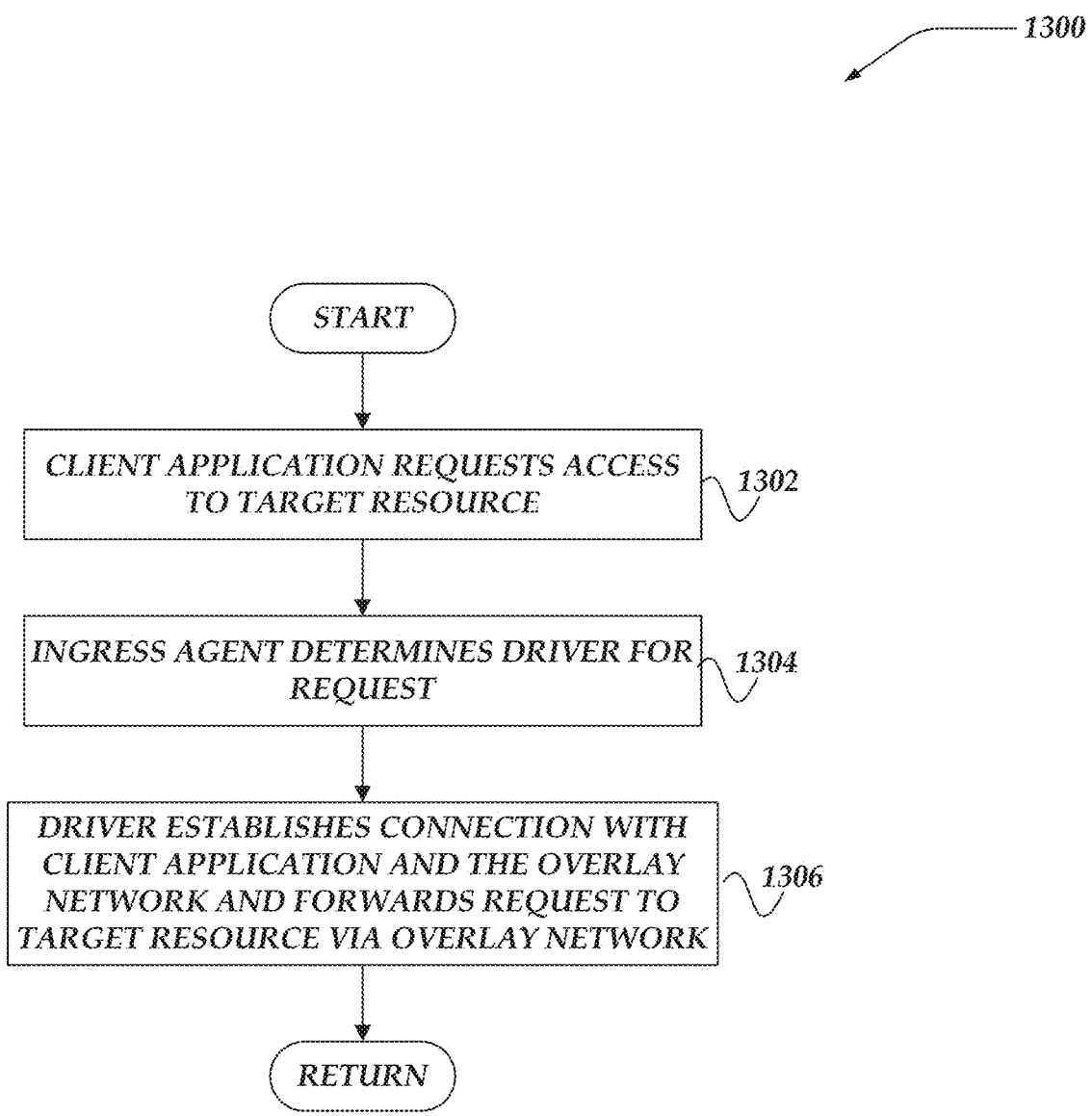
FIG. 13 illustrates a flowchart for a process for managing and monitoring endpoint activity in secured networks in accordance with one or more of the various embodiments.

FIG. 13 illustrates a flowchart for process 1300 for managing and monitoring endpoint activity in secured networks in accordance with one or more of the various embodiments. After a start block, at block 1302, in one or more of the various embodiments, a client application may request access to a target resource. As described above, in some embodiments, if a user begins to employ a client application to access a target resource managed by an infrastructure security computer, the client application may be arranged to submit a request to access a resource to a network interface associated or otherwise managed by the infrastructure security computer.

At block 1304, in one or more of the various embodiments, an ingress agent associated with the client application may determine an application driver that may be associated with the client application. In one or more of the various embodiments, ingress agents may be associated with a network interface that provides access the overlay. Accordingly, in some embodiments, the ingress agent may determine a driver that may be associated with the client application, target resource, or application protocol used by the client application and target resource.

At block 1306, in one or more of the various embodiments, the application driver may be arranged to establish a connection with the client application and the overlay network to forward the request from the client application to the target resource via the overlay network.

Next, in one or more of the various embodiments, control may be returned to a calling process.

Figure 14:
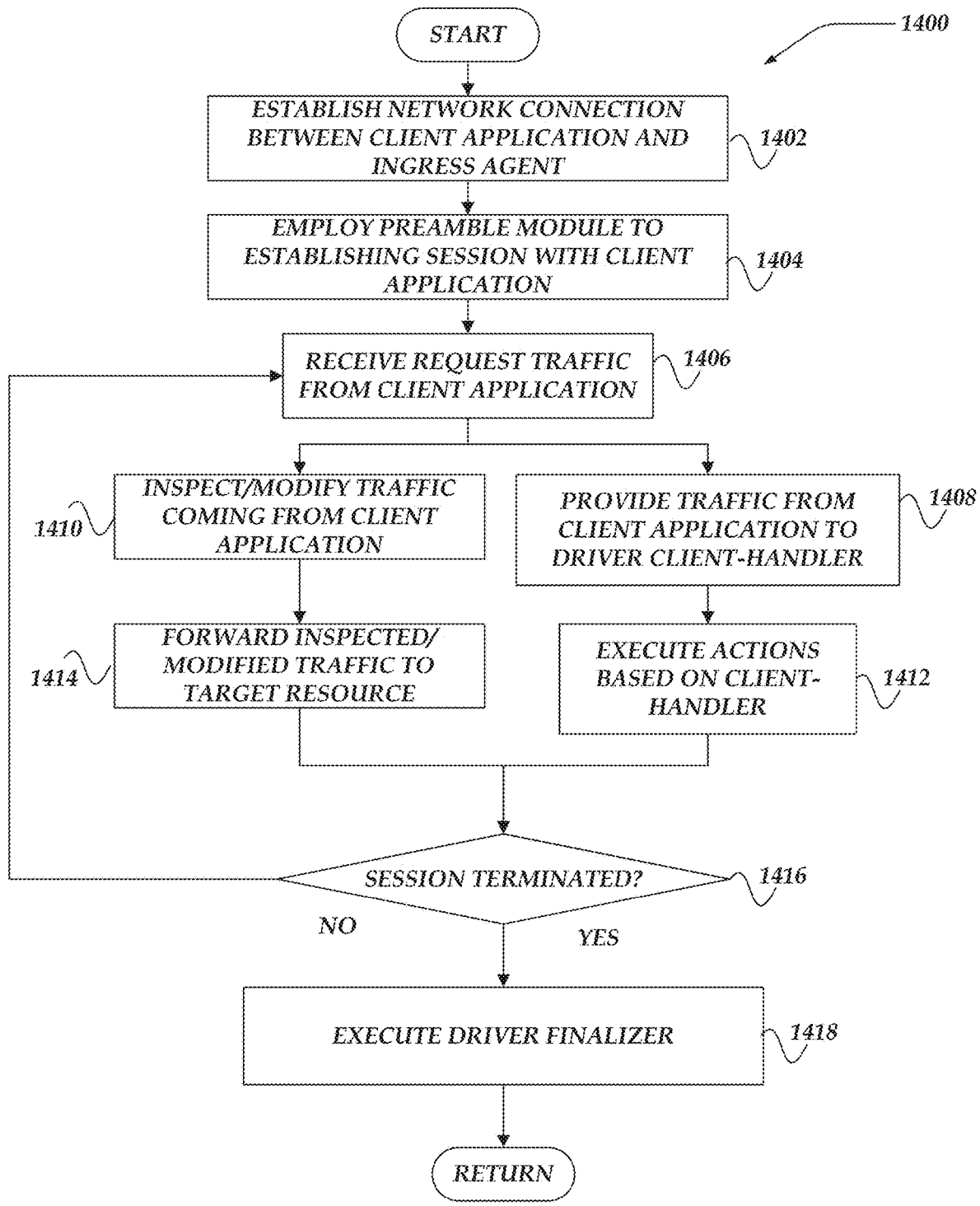
FIG. 14 illustrates a flowchart for a process for a driver for managing and monitoring endpoint activity in secured networks in accordance with one or more of the various embodiments.

FIG. 14 illustrates a flowchart for process 1400 for a driver for managing and monitoring endpoint activity in secured networks in accordance with one or more of the various embodiments. After a start block, at block 1402, in one or more of the various embodiments, a network connection between a client application and an ingress agent associated with the client application may be established.

In one or more of the various embodiments, ingress agents may be arranged to employ dialer module of a driver to open a network connection with the client application. In one or more of the various embodiments, dialer modules may be arranged to execute one or more network level actions (e.g., open, connect, listen, or the like) that may establish a network connection between the ingress agent and the client application. In one or more of the various embodiments, the particular actions executed by a dialer module may vary depending on network protocol, or other characteristics of the network environment. For example, in some embodiments, if the ingress agent and client application are running on the same computer/host, client applications may be configured to connected to ingress agents via a virtual network interface. Also, in some embodiments, if the client application and the ingress agent may be on different hosts, non-virtual network interfaces of the computers hosting the client application and the ingress agent.

At block 1404, in one or more of the various embodiments, drivers may be arranged to employ a preamble module to establish an application session between the client application and target resource. In one or more of the various embodiments, preamble modules may be arranged to execute one or more actions to establish an application-level session between the client application and ingress agent that supports the application protocol used by the target resource.

In one or more of the various embodiments, preamble modules may be arranged to execute one or more request/response cycles to establish an application session depending on the requirements of the client application or target resource. For example, in some embodiments, if an initial application handshake requires various phases, such as, requests, negotiation, secret sharing, or the like, the preamble module may be arranged to perform such actions.

Accordingly, in some embodiments, the egress agent may establish an application connection the target resource on behalf of the client application. Note, in some cases, for some embodiments, some or all of the network traffic exchanged with the target resource during the handshake may be exchanged with the client application via the overlay network and ingress agent. Accordingly, in some embodiments, handshake messages like other messages exchanged between the client applications and target resources may be intercepted and modified as necessary if forwarded to their respective destination.

At block 1406, in one or more of the various embodiments, drivers may be arranged to intercept request traffic from the client applications. In one or more of the various embodiments, if an application session may be established, subsequent requests (e.g., messages) from the client application may be received by a driver's client-tee module. Accordingly, in some embodiments, ingress agents or egress agents may be arranged to employ client-tee modules in drivers to obtain access to application traffic from client applications and then forward the application traffic to the target resource via the overlay network and the egress agent associated with the target resource.

Accordingly, in some embodiments, network traffic associated with client requests may be provided to a client-tee module of the driver system. In one or more of the various embodiments, client-tee modules may be arranged to split the traffic into two streams where a first stream provides a read-only or otherwise immutable copy of the application traffic to a client-handler module and a second stream of network traffic that may be modified before forwarding it to the target resource.

At block 1408, in one or more of the various embodiments, application traffic from the client application may be provided to a client-handler module. In one or more of the various embodiments, the application traffic provided to the client-handler module may be read-only such that the client-handler module may not modify the application traffic.

At block 1410, in one or more of the various embodiments, application traffic from the client application may be inspected or modified. In some embodiments, application traffic that is not provided to the client-handler module may be modified to conform it one or more policies that may be associated with the application session.

In some embodiments, client-tee modules may be arranged to modify the application traffic coming from the client application to modify or insert various fields or values included in the application traffic. For example, in some embodiments, secrets, overlay network information, configuration flags, or the like, that may be opaque to the client application may be included in the application traffic before providing the application traffic to the target resource.

In one or more of the various embodiments, client-tee modules may be arranged to inspect the application traffic from the client application and apply one or more rules, filters, or the like, that may be employed to modify the application traffic before it may be forwarded to the target resource.

Note, in some embodiments, the client-tee modules may be arranged to provide a separate network endpoint for the client application and another network endpoint for the target resource side of the application session via the overlay network and egress agent associated with the target resource. Thus, in some embodiments, client applications may be connected to a first endpoint provided by the ingress agent via the client-tee module and the ingress agent may provide a second endpoint that connects to the target resource via the overlay network and the egress agent associated with the client application.

At block 1412, In some embodiments, client-handler modules may be arranged to execute one or more actions based on the client application and the request traffic. In one or more of the various embodiments, client-handler modules may be arranged to interpret one or more particular application protocols. For example, in some embodiments, a client-handler module for a database client application may include particular instructions, parsers, grammars, or the like, for the particular application protocol supported by the database client application and its associated database server. Accordingly, in some embodiments, separate or different client-handler modules may be provided for different types, versions, or configuration of various client applications, target resources.

At block 1414, in one or more of the various embodiments, the client-tee may be arranged to forward the inspected or modified client-side (e.g., requests) traffic to the ingress agent for delivery to the target resource. As described above, client-tee modules may provide or otherwise maintain a connection to the client application and a connection to target resource via the overlay network and the target resource's associated egress agent. Accordingly, in some embodiments, client-tee modules may be arranged to employ the second endpoint to provide the inspected or modified application traffic to the target resource.

At decision block 1416, in one or more of the various embodiments, if the application session may be terminated, control may flow to block 1418; otherwise, control may loop back to block 1706. In one or more of the various embodiments, client-tee modules may be arranged to determine if an application session may be terminated by observing the application traffic exchanged between the client application and the target resource. Accordingly, in some embodiments, if commands or messages indicating the application session may be terminated are observed, the client-tee module may close down the application session. Also, in some embodiments, client-tee modules may be arranged to be responsive to network level disconnects, resets, or shutdowns, that may indicate that the application session is terminated.

Further, in some embodiments, client-tee modules or other driver system modules may be arranged to terminate the application session in response to various events, conditions, or circumstances that may be declared in the driver system. Accordingly, in some embodiments, if such an event, condition, or circumstance should be detected or observed, client-tee modules may be configured to terminate the application session.

Also, in some embodiments, infrastructure security computers may be enabled to send one or more commands or messages to an ingress agent associated with the client application such that one or more commands or one or more messages may indicate that the application session should be closed. For example, in some embodiments, infrastructure security computers may send a termination message if the privileges of the user participating in an application session may be revoked.

Other reasons for terminating an application session may include, quota exhaustion/violation, timeouts, error conditions, network connection failure, or the like.

At block 1418, in one or more of the various embodiments, drivers may be arranged to execute one or more actions based on the finalizer module associated with the driver. In one or more of the various embodiments, finalizer modules may be arranged to execute various actions to cleanup an application session. For example, this may include closing file handles, close network connections, removing temporary files, freeing/release system resources, or the like.

In one or more of the various embodiments, the particular cleanup actions may vary depending on the target resource, client application, application session activity, or the like.

Next, in one or more of the various embodiments, control may be returned to a calling process.

Figure 15:
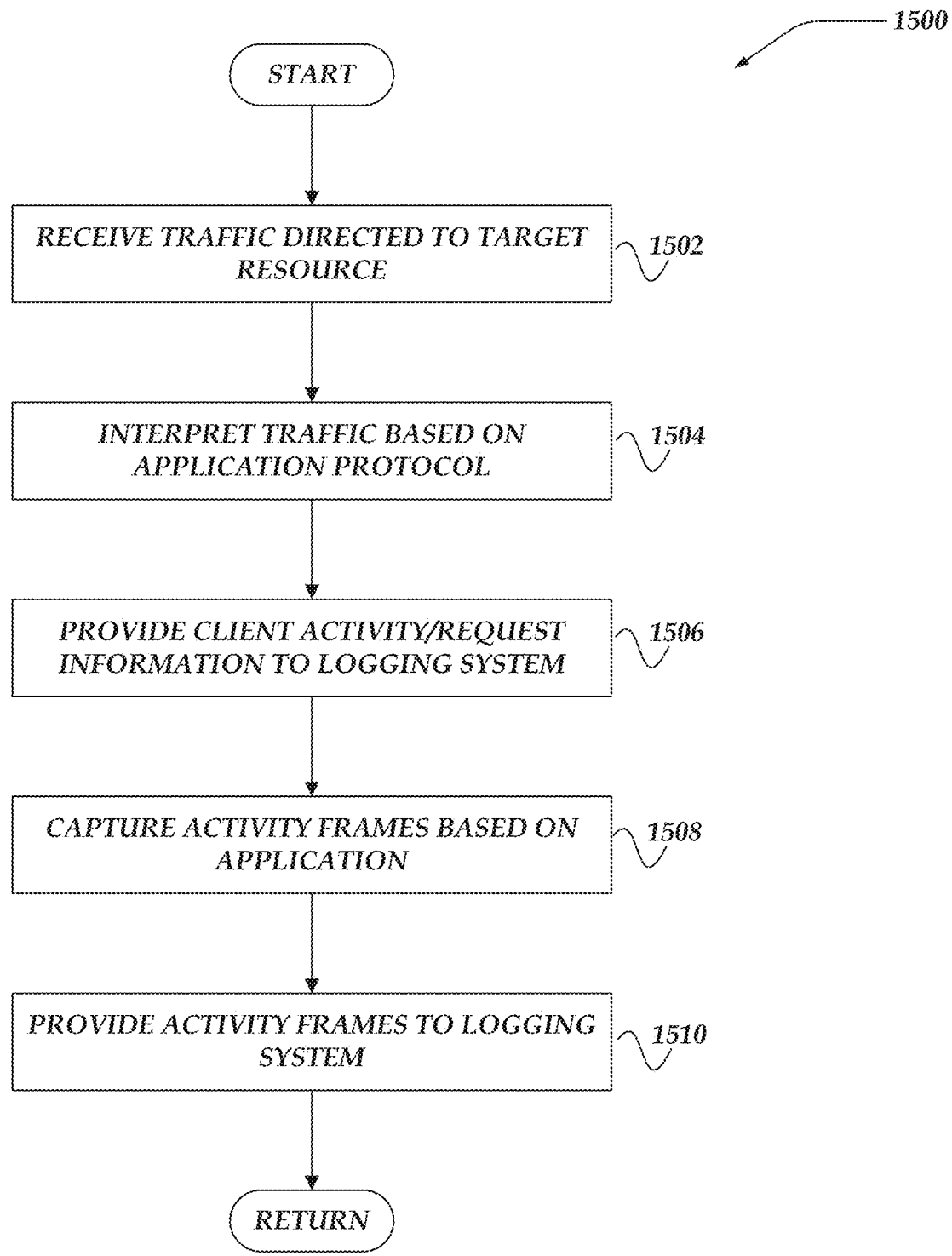
FIG. 15 illustrates a flowchart for a process for a client-handler module for managing and monitoring endpoint activity in secured networks in accordance with one or more of the various embodiments.

FIG. 15 illustrates a flowchart for process 1500 for a client-handler module for managing and monitoring endpoint activity in secured networks in accordance with one or more of the various embodiments. After a start block, at block 1502, in one or more of the various embodiments, client-handler modules may be arranged to receive a copy of the request traffic from a client application that may be directed to a target resource. As described above, client application requests may be intercepted at or by the client-tee modules. Accordingly, in some embodiments, client-tee modules may be arranged to forward an original or otherwise unmodified copy of the client originating application traffic to a client-handler module.

At block 1504, in one or more of the various embodiments, client-handler modules may be arranged to interpret the client request traffic based on the application protocol employed by the client application and target resource. In one or more of the various embodiments, client-handler modules may be arranged to interpret the request traffic in view of the corresponding application protocol.

Accordingly, in some embodiments, client-handler modules may be arranged to monitor or screen for one or more conditions or values in the request traffic. In some embodiments, client-handler modules may be arranged to include one or more triggers that if matched may initiate one or more actions. In some embodiments, the particular trigger conditions, triggered actions, or the like, may vary depending on the application protocol, client application, target resource, or the like.

Accordingly, in some embodiments, new or different triggers or triggered actions may be introduced by modifying or adapting client-handler modules. Thus, in some embodiments, different organizations may be enabled to configure mesh agents to conform to one or more local requirements or local circumstance. For example, in some embodiments, client-handler modules may include instructions, parsers, grammars, or the like, to validate or one or more fields in application traffic originating from client applications.

At block 1506, in one or more of the various embodiments, client-handler modules may be arranged to provide client application activity/request information to a logging system.

In some embodiments, request/response logging may be provided by client-handler modules. Accordingly, in some embodiments, a client-handler module for a particular application protocol may be arranged to include parsers, grammars, or the like, that enable the client activity or request information to be extracted from the request traffic. In some embodiments, the extract response information may be inherently human-readable. Also, in some embodiments, client-handler modules may be arranged to map codes, values, or the like, to one or more human readable formats. In some cases, for some embodiments, client-handler modules may be arranged to decode compressed or otherwise encoded values into formats that may be human readable. In some embodiments, client-handler modules may be arranged to declare one or more masks or templates that may be applied to information extracted from request traffic. Accordingly, in some embodiments, the application traffic information associated with client activity may be re-formatted into other formats.

Further, in some embodiments, client-handler modules may be arranged to selectively capture raw network traffic (wire-traffic) associated with client activity.

For example, in some embodiments, if an application protocol provides serial numbers, sequence numbers, or the like, that may be employed to associate requests, responses, application sessions, or the like, client-handler modules may be arranged to group or link some or all client activity traffic with its associated target resource activity traffic.

Also, in some embodiments, client-handler modules may be arranged to record response information in a same log store (e.g., log file) as target resource activity information. Thus, in some embodiments, time proximity of requests or responses may be indicative of the association between particular requests and particular responses.

In one or more of the various embodiments, client-handler modules may be arranged to forward some or all client activity information to one or more logging systems that may be provided by other services/processes. In some cases, logging systems may be configured to store logged information in local data stores or file systems. Also, in some embodiments, logging systems may be configured to store logged information in remote data stores or file systems that may be accessible via the overlay network or the underlay network.

At block 1508, in one or more of the various embodiments, client-handler modules may be arranged to determine one or more activity frames based on client activity traffic associated with one or more requests from the client application.

In some embodiments, some applications may support or provide one or more metaphors/idioms, such as, pages, screens, sessions, transactions, or the like. Accordingly, in some embodiments, client-handler modules may be arranged to generate activity frames that may correspond to pages, screens, sessions, transactions, or the like, for a given client application or target resource.

In one or more of the various embodiments, an activity frame may comprise request/response information that may be logically grouped or collected into pages, screens, transactions, sessions, or the like. Necessarily, in some embodiments, the collection of the activity information into an activity frame may vary depending on particular client application, target resource, application protocol, or the like.

Also, in some embodiments, different organizations may require different activity frame definitions depending on local requirements or local circumstances. Further, in some cases, some client applications, target resources, or application protocols may not support a logical grouping of activity that may be advantageous to represent as activity frames. Accordingly, in some embodiments, for some client applications, target resources, application protocols, or the like, client-handler modules may be arranged to omit generating activity frames.

As one example, if the client application is a database client, the relevant activity frame may be request/response traffic associated with a database transaction. Also, for example, in some embodiments, if the client application is a ssh shell connection to the target resource, the activity frame may be configured to contain request/response traffic that may be equivalent to what may be shown in a conventional terminal screen (e.g., 40 lines of 80 characters of text per activity frame, or the like). Also, in some embodiments, additional information, such as, screen captures, host computer process activity, resource utilization information, or the like, may be included in activity frames to provide additional context related to the application session.

At block 1510, In one or more of the various embodiments, client-handler modules may be arranged to provide the one or more activity frames to the logging system.

Similar to the individual logging of client activity information, activity frames may be provided to a logging system that enables users to review the activity at a late date.

Next, in one or more of the various embodiments, control may be returned to a calling process.

Figure 16:
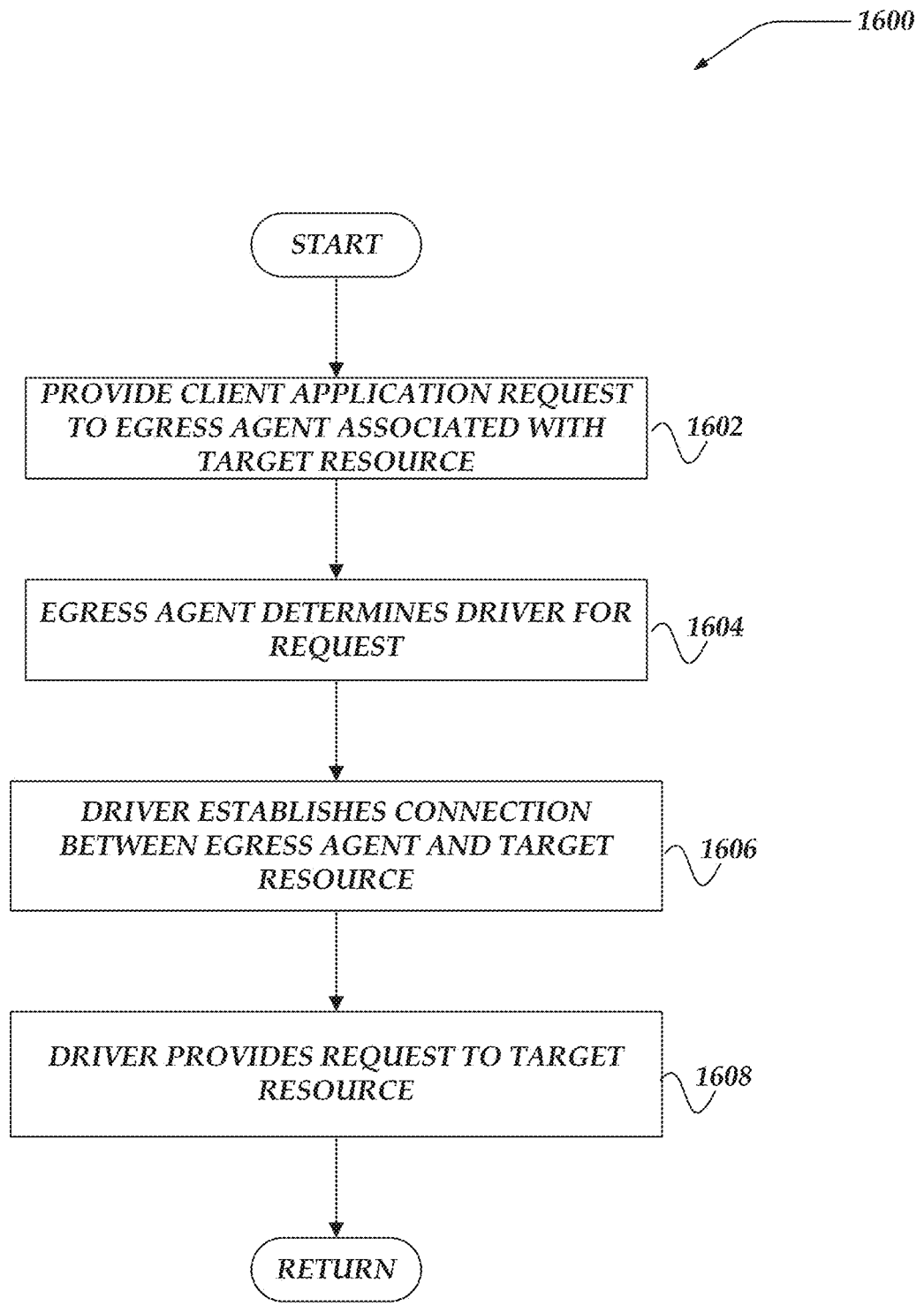
FIG. 16 illustrates a flowchart for a process for managing and monitoring endpoint activity in secured networks in accordance with one or more of the various embodiments.

FIG. 16 illustrates a flowchart for process 1600 for managing and monitoring endpoint activity in secured networks in accordance with one or more of the various embodiments. After a start block, at block 1602, in one or more of the various embodiments, client application requests may be provided to an egress agent associated with a target resource. As described above, in some embodiments, requests or other communications from client applications to a target resource may be routed to an ingress agent and then routed through an overlay network or other managed network to an egress agent that may be associated with the target resource. As described above, infrastructure security computer may be arranged to provide routing information, privilege checking, credentials, or the like, that enable the message/request from the client application to reach the egress agent associated with the target resource.

At block 1604, in one or more of the various embodiments, egress agents may be arranged to determine an application driver for the request. In some embodiments, egress agents may be arranged to support one or more target resources. Accordingly, in some embodiments, egress agents may be arranged to inspect the initial traffic from the client application to determine a particular driver. Also, in some embodiments, infrastructure security computers may be arranged to provide information for determining a driver as part of the authorization/authentication process that enables the traffic from the client application to reach the egress agent.

At block 1606, in one or more of the various embodiments, the application driver may be arranged to establish a connection between the egress agent and the target resource.

At block 1608, in one or more of the various embodiments, the application driver may be arranged to provide the request from the client application to the target resource.

Next, in one or more of the various embodiments, control may be returned to a calling process.

Figure 17:
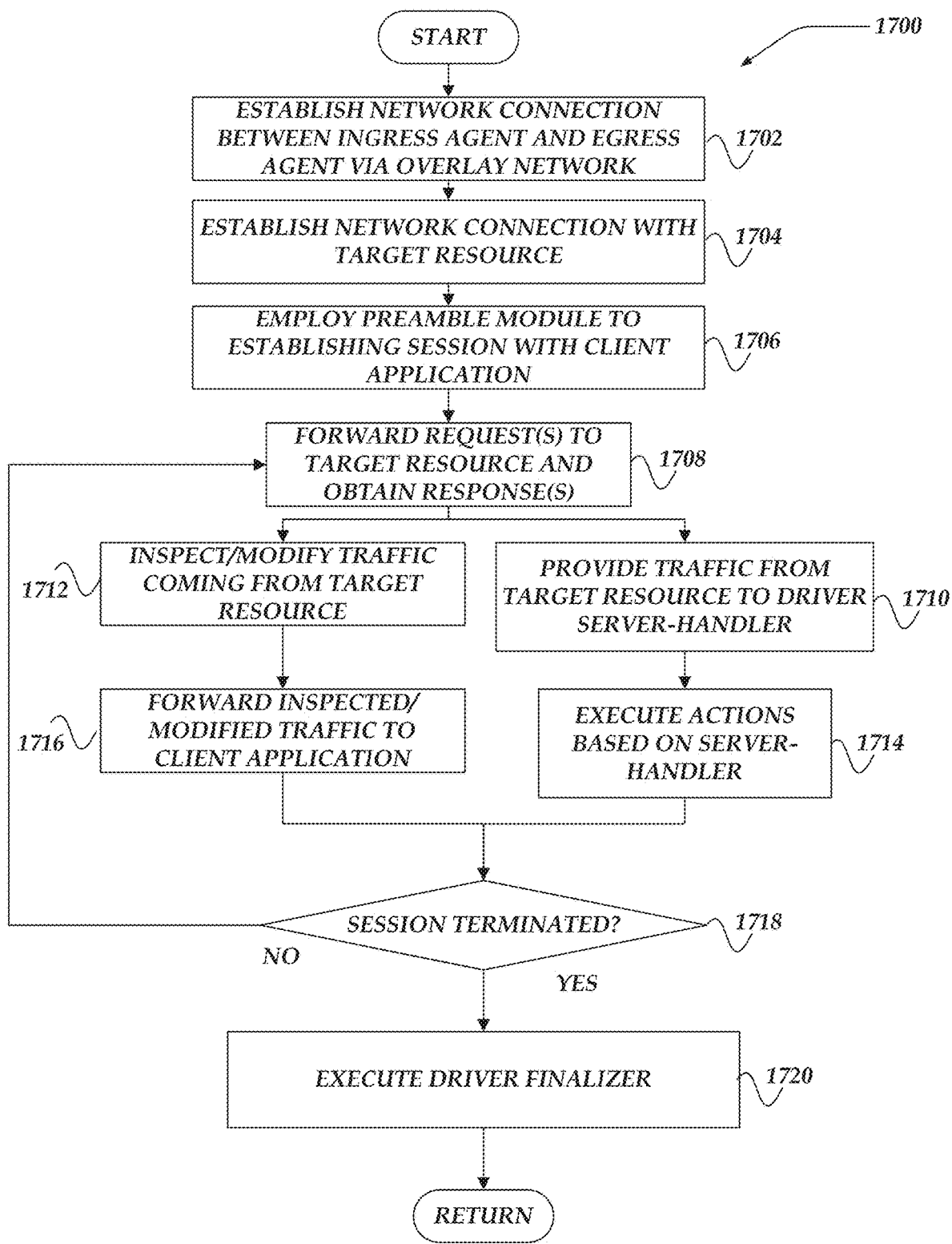
FIG. 17 illustrates a flowchart for a process for a driver for managing and monitoring endpoint activity in secured networks in accordance with one or more of the various embodiments.

FIG. 17 illustrates a flowchart for process 1700 for a driver for managing and monitoring endpoint activity in secured networks in accordance with one or more of the various embodiments. After a start block, at block 1702, in one or more of the various embodiments, a network connection between an ingress agent associated with a requesting client application and an egress agent associated with a target resource may be established.

At block 1704, in one or more of the various embodiments, egress agents may be arranged to employ dialer module from a driver to open a network connection with the target resource. In one or more of the various embodiments, dialer modules may be arranged to execute one or more network communication protocol level actions (e.g., open, connect, listen, or the like) that may establish a network connection between the egress agent and the target resource. In one or more of the various embodiments, the particular actions executed by a dialer module may vary depending on the network communication protocol, or other characteristics of the network environment. For example, in some embodiments, if the egress agent and target resource are running on the same computer/host, egress agents may be configured to connect to a virtual network interface configured on the computer that may be hosting the egress agent and the target resource. Also, in some embodiments, if the egress agent and target resource may be on different hosts, non-virtual network interfaces of the computer hosting the egress agent and the computer hosting the target resource may be employed.

At block 1706, in one or more of the various embodiments, drivers may be arranged to employ a preamble module to establish an application session with the target resource. In one or more of the various embodiments, preamble modules may be arranged to execute one or more actions to establish an application-level session between the egress agent and the target resource. Accordingly, in some embodiments, egress agents may submit user credentials to the preamble module to enable the preamble module to login to the target resource if required by the particular target resource application. In some embodiments, credentials may be assumed to be available to the egress agent such that preamble modules may be indifferent to how the credentials may be obtained as long as they may be provided to the preamble module.

In one or more of the various embodiments, preamble modules may be arranged to execute one or more request/response cycles to establish an application session depending on the requirements of the target resource. For example, in some embodiments, if an initial application handshake requires various phases, such as, requests, negotiation, secret sharing, challenge-response, or the like, the preamble module may be arranged to perform such actions.

Accordingly, in some embodiments, the egress agent may establish an application connection the target resource. Note, in some cases, for some embodiments, some or all of the network traffic exchanged with the target resource during the handshake may be exchanged with the client application via the overlay network and ingress agent. Accordingly, in some embodiments, messages associated with handshake activity that may be exchanged between the client application and target resource may be intercepted and modified as necessary and then forwarded to their respective destination.

At block 1708, in one or more of the various embodiments, drivers may be arranged to provide requests from the client application to the target resource and receive one or more associated responses from the target resource. In one or more of the various embodiments, if an application session may be established, subsequent requests (e.g., messages) from the client application may be received by the associated egress agent. Accordingly, in some embodiments, egress agents may be arranged to employ client-tee modules in the driver to obtain application traffic from client application and then forward application traffic based on the intercept traffic to the target resource.

Accordingly, in some embodiments, if the target resource provides one or more responses, network traffic that comprise the responses may be provided to a server-tee module of the driver system. In one or more of the various embodiments, server-tee modules may be arranged to split the traffic into two streams where a first stream provides a read-only or otherwise immutable copy of the application session traffic to a server-handler module of the egress agent and a second stream of application session traffic that may be modified before forwarding to the client application.

At block 1710, in one or more of the various embodiments, response traffic from the target resource may be provided to a server-handler module. In one or more of the various embodiments, drivers may be arranged to include server-handler modules that receive the application traffic from the target resource. In one or more of the various embodiments, the application traffic provided to the server-handler module may be read-only such that the server-handler module does not modify the application traffic.

At block 1712, in one or more of the various embodiments, response traffic from the target resource may be inspected or modified. In some embodiments, application traffic that is not provided to the server-handler module may be modified to conform it the client application that initiated the application session. In some embodiments, server-tee modules may be arranged to modify the application traffic from the target resource to hide or mask various fields or values included in the application traffic. For example, in some embodiments, secrets, local network information, configuration flags, or the like, that expose sensitive or irrelevant details about the target resource may be removed or replaced.

In one or more of the various embodiments, server-tee modules may be arranged to inspect the application traffic from the target resource and apply one or more rules, filters, or the like, that may be employed to modify the application traffic before forwarding it to the client application via the overlay network.

Note, in some embodiments, the server-tee modules may be arranged to provide a separate network endpoint for the target resource and another network endpoint for the client application (via the overlay network/ingress agent). Thus, in some embodiments, the target resource application/server may be connected a first endpoint provided by the egress agent via the server-tee module and the egress agent may provide a second endpoint that connects to the client application via the overlay network and the ingress agent associated with the client application.

At block 1714, In some embodiments, server-handlers may be arranged to execute one or more actions based on the target resource and the response traffic. In one or more of the various embodiments, server-handler modules may be arranged to interpret one or more particular application protocol. For example, in some embodiments, a server-handler module for a database server may include particular instructions, parsers, grammars, or the like, for the particular application protocol supported by the database server. Accordingly, in some embodiments, separate or different server-handler modules may be provided for different types, versions, or configuration of various target resources.

At block 1716, in one or more of the various embodiments, the server-tee may be arranged to forward the inspected or modified response traffic to the client application. As described above, server-tee modules may provide or otherwise maintain a connection to the client application via the overlay network and the ingress agent associated with the client application. Accordingly, in some embodiments, server-tee modules may be arranged to employ this endpoint to provide the inspected or modified application traffic to the client application.

At decision block 1718, in one or more of the various embodiments, if the application session may be terminated, control may flow to block 1718; otherwise, control may loop back to block 1706. In one or more of the various embodiments, server-tee modules may be arranged to determine if an application session may be terminated by observing the application traffic exchanged between the client application and the target resource. Accordingly, in some embodiments, if commands or messages indicating the application session may be terminated are observed, the server-tee module may close down the application session. Also, in some embodiments, server-tee modules may be arranged to be responsive to network level disconnects, resets, or shutdowns, that may indicate that the application session is terminated.

Further, in some embodiments, server-tee modules or other driver system modules may be arranged to terminate the application session in response to various events, conditions, or circumstances. Accordingly, in some embodiments, if such an event, condition, or circumstance should be detected or observed, the server-tee module may terminate the application session.

In some embodiments, infrastructure security computers may be enabled to send one or more commands or messages to an egress agent that may indicate that application session should be closed. For example, in some embodiments, infrastructure security computers may be arranged to send a termination message if the privileges of the user accessing a target resource have been revoked.

Other reasons for terminating an application session may include, quota exhaustion/violation, timeouts, error conditions, network connection failure, or the like, depending on policies. Accordingly, in some embodiments, drivers may be arranged to employ rules, parameters, threshold values, heuristics, or the like, provided by configuration information to account for local requirements or local circumstances.

At block 1720, in one or more of the various embodiments, drivers may be arranged to execute one or more actions based on the finalizer module associated with the a given driver. In one or more of the various embodiments, finalizer modules may be arranged to execute one or more actions to cleanup an application session. For example, this may include closing file handles, closing network connections, removing temporary files, freeing/releasing system resources, or the like.

In one or more of the various embodiments, the particular cleanup actions may vary depending on the target resource, client application, application session activity, or the like. Accordingly, in some embodiments, finalizer modules for different organizations or target resources may execute different cleanup actions.

Next, in one or more of the various embodiments, control may be returned to a calling process.

Figure 18:
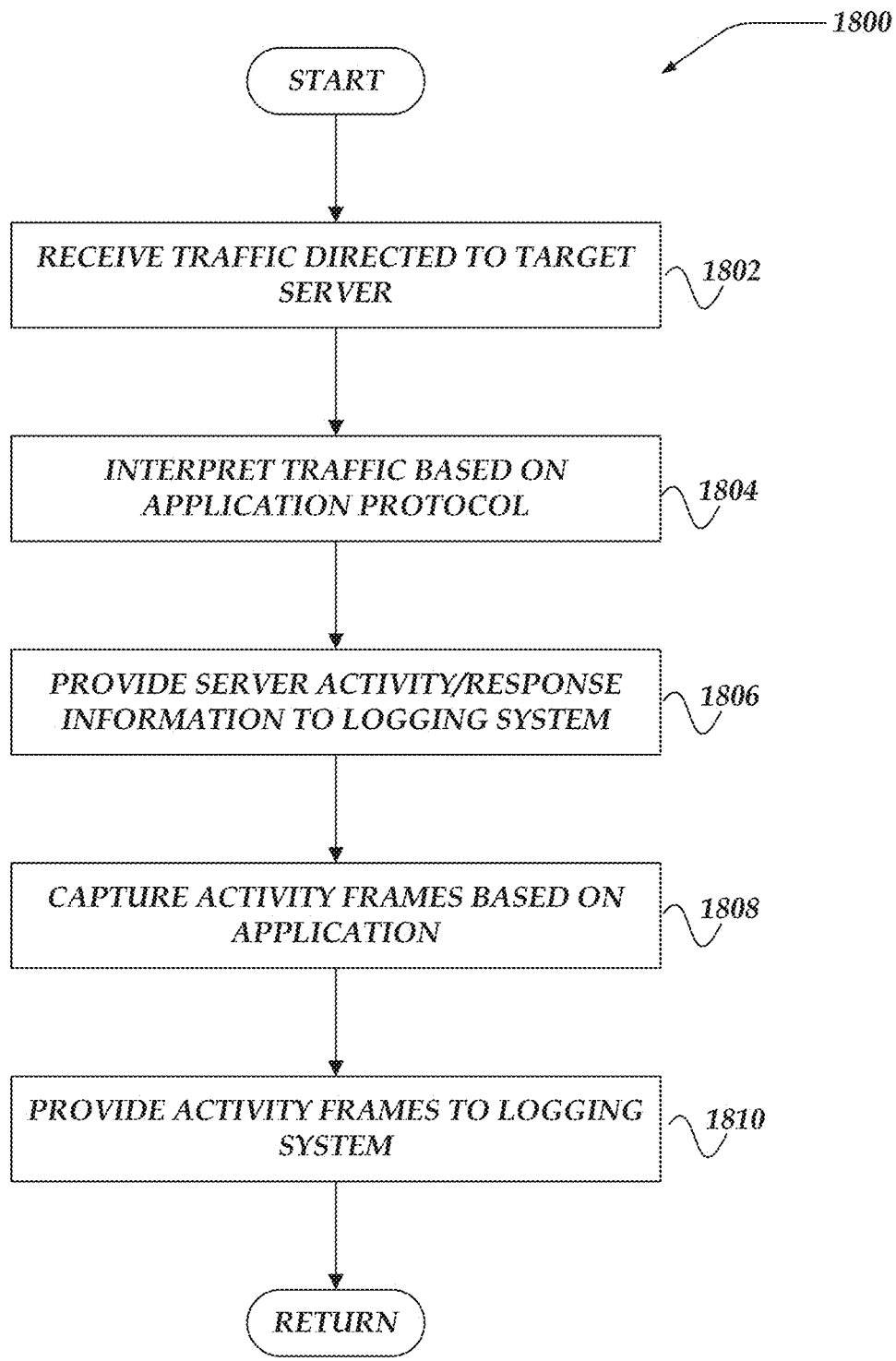
FIG. 18 illustrates a flowchart for a process for a server-handler module for managing and monitoring endpoint activity in secured networks in accordance with one or more of the various embodiments.

FIG. 18 illustrates a flowchart for process 1800 for a server-handler module for managing and monitoring endpoint activity in secured networks in accordance with one or more of the various embodiments. After a start block, at block 1802, in one or more of the various embodiments, server-handler modules may be arranged to receive a copy of the response traffic associated with a target resource. As described above, responses to client application requests may be intercepted at or by the server-tee modules. Accordingly, in some embodiments, server-tee modules may be arranged to forward an original or otherwise unmodified copy of the response traffic to a server-handler module.

At block 1804, in one or more of the various embodiments, server-handler modules may be arranged to interpret the response traffic based on the application protocol employed by the client application and target resource. In one or more of the various embodiments, server-handler modules may be arranged to interpret the response traffic in view of the corresponding application protocol. Accordingly, in some embodiments, server-handler modules may be arranged to monitor or screen for one or more conditions or values in the response traffic. In some embodiments, server-handler modules may be arranged to include one or more triggers that if matched may initiate one or more actions. In some embodiments, the particular trigger conditions, triggered actions, or the like, may vary depending on the application protocol, client application, target resource, organizational policies, or the like. Accordingly, in some embodiments, new or different triggers or triggered actions may be introduced by modifying or adapting server-handler modules. Thus, in some embodiments, different organizations may be enabled to configure egress agents to conform to one or more local requirements or local circumstance. For example, in some embodiments, server-handler modules may include instructions, parsers, grammars, or the like, to validate or one or more fields in response traffic.

At block 1806, in one or more of the various embodiments, server-handler modules may be arranged to provide server activity/response information to a logging system.

In some embodiments, request/response logging may be provided by server-handler modules. Accordingly, in some embodiments, a server-handler module for a particular application protocol may be arranged to include parsers, grammars, or the like, that enable the response information to be extracted from the response traffic. In some embodiments, the extracted response information may be inherently human-readable. Also, in some embodiments, server-handler modules may be arranged to map codes, values, or the like, to one or more human readable formats. In some cases, for some embodiments, server-handler modules may be arranged to decode compressed or otherwise encoded values into formats that may be human readable. In some embodiments, server-handler modules may be arranged to declare one or more masks or templates that may be applied to information extracted from response traffic.

Further, in some embodiments, server-handler modules may be arranged to selectively capture raw network traffic (wire-traffic) associated with response traffic.

In some embodiments, if an application protocol provides serial numbers, sequence numbers, or the like, that may be employed to associated requests, responses, application sessions, or the like, server-handler modules may be arranged to group or link some or all response traffic with its associated request traffic.

Also, in some embodiments, server-handler module may be arranged to record response information in a same log store (e.g., log file) as request information. Thus, in some embodiments, time proximity of requests or responses may be indicative of the association between particular requests and particular responses.

In one or more of the various embodiments, server-handler modules may be arranged to forward some or all response information to one or more logging systems that may be provided by other services/processes. In some cases, logging systems may be configured to store logged information in local data stores or file systems. Also, in some embodiments, logging systems may be configured to store logged information in remote data stores or file systems that may be accessible via the overlay network or the underlay network.

At block 1808, in one or more of the various embodiments, server-handler modules may be arranged to determine one or more activity frames based on response traffic associated with one or more responses from the target resource.

In some embodiments, some applications may support or provide one or more operational metaphors/idioms, such as, pages, screens, sessions, transactions, or the like. Accordingly, in some embodiments, server-handler modules may be arranged to generate activity frames that may correspond to pages, screens, sessions, transactions, or the like, for a given client application or target resource.

In one or more of the various embodiments, an activity frame may comprise request/response information that may be logically grouped or collected into pages, screens, transactions, sessions, or the like. Necessarily, in some embodiments, the collection of the traffic into an activity frame may vary depending on particular client application, target resource, application protocol, or the like. Also, in some embodiments, different organizations may require different activity frame definitions depending on local requirements or local circumstances. Further, in some cases, some applications, target resources, or application protocols may not require or support a logical grouping of activity that may be advantageous to represent as activity frames. Accordingly, in some embodiments, for some applications, target resources, or application protocols server-handler modules may be arranged to omit generating activity frames.

As one example, if the client application is a database client, the relevant activity frame may be request/response traffic associated with a database transaction. Also, for example, in some embodiments, if the client application is a ssh shell connection to the target resource, the activity frame may be configured to contain request/response traffic that may be equivalent to what may be shown in a conventional terminal screen (e.g., 40 lines of 80 characters of text, or the like). Also, in some embodiments, additional information, such as, screen captures, network traffic packet-data captures, process activity, resource utilization information, or the like, may be included in activity frames to provide additional context related to the application session.

At block 1810, In one or more of the various embodiments, server-handler modules may be arranged to provide the one or more activity frames to the logging system.

Similar to the individual logging of response information, activity frames may be provided to a logging system that enables users to review the activity at a late date.

Next, in one or more of the various embodiments, control may be returned to a calling process.

Figure 19:
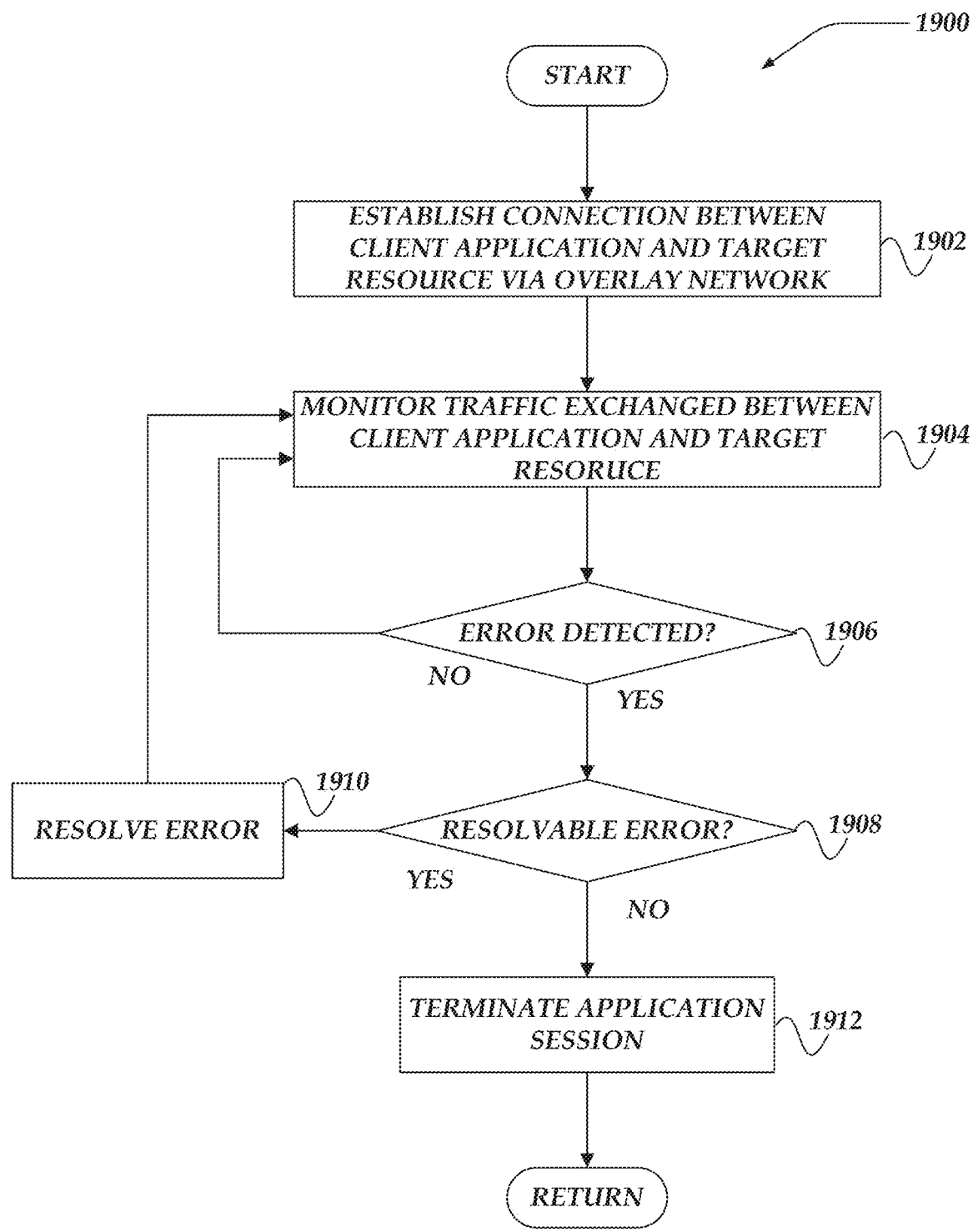
FIG. 19 illustrates a flowchart for a process for error handling during an application session for managing and monitoring endpoint activity in secured networks in accordance with one or more of the various embodiments.

FIG. 19 illustrates a flowchart for process 1900 for a error handling during an application session for managing and monitoring endpoint activity in secured networks in accordance with one or more of the various embodiments. After a start block, at block 1902, in one or more of the various embodiments, connections between a client application and target resource may be established via an overlay network. As described above, client applications may be enabled to connect to an ingress agent and target resources may be enabled to connect to an egress agent. Accordingly, other mesh agents under the supervision of an infrastructure security computer may establish a tunnel between the ingress agent and the egress agent to enable authorized users to access the target resource.

As described above, in some embodiments, ingress agents may be arranged to provide a network endpoint for the client application and a separate endpoint that connects the overlay network. Similarly, in some embodiments, egress agent may be arranged to provide an network endpoint the connects to the overlay network and another endpoint that connects to the target resource.

As described above, in some embodiments, driver systems may provide client-tee and server-tee modules for providing the network endpoints. Accordingly, in some embodiments, client-tee modules may be arranged to provide the endpoint that receives network traffic that originates from the client application and another endpoint that may employed to forward the client application traffic to the overlay network for providing to the target resource.

Similarly, in some embodiments, server-tee modules may be arranged to provide the endpoint that receives network traffic originating from the target resource and an endpoint that enables the network traffic originating from the target resource to be forwarded to the client application via the overlay network.

Also, in some embodiments, as described above, the allocation of responsibilities of ingress agents and egress agents may vary depending on the client application, target resource, or organization policy. For example, in some embodiments, in some cases, ingress agents may be configured to pass-through some or all client application traffic such that the egress agent associated with the target resource executes may be responsible for monitoring/managing the application session. Thus, for example, in some embodiments, if an application session may be established, the client-tee and server-tee at the egress agent may provide the monitoring or management of both sides of the application traffic.

At block 1904, in some embodiments, ingress agents or egress agents may be arranged to monitor the network traffic exchanged between the client application and the target resource. As described above, various driver modules, such as, client-tee modules, client-handlers, server-tee modules, server-handler modules, or the like, may be enabled to interpret application traffic. Accordingly, in some embodiments, such modules may be arranged to enforce one or more policies or monitor for one or more error conditions.

At decision block 1906, in one or more of the various embodiments, if an error may be detected, control may flow to decision block 1908; otherwise, control may loop back to block 1904.

At decision block 1908, in one or more of the various embodiments, if the detected error(s) may be resolvable, control may flow to block 1910; otherwise, control may flow to block 1912.

In some embodiments, tee-modules may be arranged to classify the error based on one or more application traffic characteristics, error codes, system error messages, host system behavior, or the like. Accordingly, in some embodiments, errors may be classified as resolvable or non-resolvable.

At block 1910, in one or more of the various embodiments, one or more driver modules may be arranged to perform one or more actions to that may resolve the error. Next, in some embodiments, control may loop back to block 1904.

In one or more of the various embodiments, the particular actions for resolving the error may depend on the client application, target resource, error type, or the like. For example, in some embodiments, if waiting for a network protocol response or acknowledgment times out, a tee-module may be arranged to automatically re-try the request.

Accordingly, in some embodiments, tee-modules may be arranged to classify the error based on one or more application traffic characteristics, error codes, system error messages, host system behavior, or the like. Thus, in some embodiments, tee-module may be arranged to select one or more actions, such as, retries, or the like, to attempt to resolve the error.

Note, if an error may be resolvable, some or all of the consequences associated with the error may be isolated from one or more of the client application or target resource depending on the origination of the error. For example, if the error is a resolvable timeout error associated with an egress agent's connection with a target resource, the connection to the client application may be unaffected. Accordingly, in this example, the egress agent may maintain the connection the client application (via the overlay network) while the connection errors with the target resource may be resolved.

At block 1912, in one or more of the various embodiments, driver modules may be arranged to terminate the application session. As described above, in some embodiments, drivers may be arranged to terminate an application session. Accordingly, in some embodiments, finalizer modules, if available, may be arranged to clean-up artifacts that may be remain if the application session is terminated. In some embodiments, this may include closing one or more connections to the overlay network, client application, or target resource. In some cases, if one side of the connection abruptly fails, finalizer modules, or the like, may be arranged to formally/safely close the other side of the connection. For example, if a network connection to a target resource is lost and cannot be restored timely, a driver may be arranged to employ application protocol messages to safely close the client application side of the application session.

Next, in one or more of the various embodiments, control may be returned to a calling process.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiments, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

What is claimed as new and desired to be protected by Letters Patent of the United States is:

1. A method for managing access to network resources in a network using one or more processors that are configured to execute instructions, wherein the execution of the instructions enables performance of actions, comprising:
   providing an overlay network that is employed to provide a secure tunnel between a client and a resource server; and
   in response to a client request being provided to an egress mesh agent associated with the resource server, wherein the client request is provided via a first network connection, performing further actions, including:
   determining a driver that is associated with the resource server based on the client request, wherein the driver includes one or more of a server-tee module and a server-handler module;
   providing the client request to the resource server via a different second network connection;
   providing one or more responses from the resource server to the server-tee module via the provided secure tunnel, wherein the server-tee module provides a copy of the one or more responses from the resource server to the server-handler module;
   employing the server-handler module to generate log information based on the one or more copied responses; and
   employing the server-tee module to modify the one or more responses from the resource server, wherein the one or more responses are forwarded to the client via the first network connection over the overlay network and the modification is based on one or more localization features selected from geo-location information.

2. The method of claim 1, wherein performing further actions, further comprises:
   employing a dialer module included in the driver to establish a second network connection between the agent and the resource server, wherein the second network connection is employed to exchange network traffic between the agent the resource server.

3. The method of claim 1, wherein performing further actions, further comprises:
   providing credential information associated with the client to a preamble module that is included in the driver;
   employing the preamble module to exchange one or more messages with the resource server based on an application protocol associated with the resource server; and
   establishing the application session between the agent and the resource server based on the one or more messages.

4. The method of claim 1, wherein employing the server-tee module to modify the one or more responses from the resource server, further comprises:
   inspecting network traffic associated with the one or more responses based on an application protocol associated with the resource server;
   modifying the network traffic to replace one or more values in the inspected network traffic with one or more other values based on the application protocol and one or more overlay network policies; and
   modifying the one or more responses to include the modified network traffic.

5. The method of claim 1, wherein employing the server-handler module to generate the log information, further comprises:
   inspecting network traffic associated with the one or more copied responses;
   determining one or more activity records associated with the one or more copied responses based on an application protocol associated with the resource server, wherein each activity record corresponds to a copied response; and
   storing the one or more activity records in a log information data store.

6. The method of claim 1, wherein employing the server-handler module to generate the log information, further comprises:
   inspecting network traffic associated with the one or more copied responses;
   collecting one or more activity records associated with the one or more copied responses;
   in response to the collection of the one or more activity records matching one or more conditions based on the application protocol and the server-handler module, generating one or more activity frames based on the one or more collected activity records, wherein the one or more activity frames are stored in a log data store.

7. The method of claim 1, wherein performing further actions, further comprises:
   in response to an application session associated with the client request terminating, employing a finalizer module included in the driver to execute one or more actions to remove one or more artifacts associated with the application session based on the application protocol or the resource server.

8. The method of claim 1, wherein performing further actions, further comprises:
   in response to detecting an error associated with the one or more responses, performing one or more other actions, including:
   classifying the error based on one or more of an application protocol associated with the resource server, or network traffic associated with a network connection to the resource server;
   resolving the classified error based on a classification of the error as resolvable, wherein the resolution of the error includes one or more of resending one or more client requests, or sending one or more modified client requests, and wherein the modifications to the one or more modified client requests include setting one or more values in the one or more modified client requests based on the application protocol.

9. A system for managing access to network resources, comprising:
a network computer, comprising:
a memory that stores at least instructions; and
one or more hardware processors that execute instructions that perform actions, including:
providing an overlay network that is employed to provide a secure tunnel between a client and a resource server; and
in response to a client request being provided to an egress mesh agent associated with the resource server, wherein the client request is provided via a first network connection, performing further actions, including:
determining a driver that is associated with the resource server based on the client request, wherein the driver includes one or more of a server-tee module and a server-handler module;
providing the client request to the resource server via a different second network connection;
providing one or more responses from the resource server to the server-tee module via the provided secure tunnel, wherein the server-tee module provides a copy of the one or more responses from the resource server to the server-handler module;
employing the server-handler module to generate log information based on the one or more copied responses; and
employing the server-tee module to modify the one or more responses from the resource server, wherein the one or more responses are forwarded to the client via the first network connection over the overlay network and the modification is based on one or more localization features selected from geo-location information; and
a client computer, comprising:
a memory that stores at least instructions; and
one or more hardware processors that execute instructions that perform actions, including:
providing the client request.

10. The system of claim 9, wherein performing further actions, further comprises:
employing a dialer module included in the driver to establish a second network connection between the agent and the resource server, wherein the second network connection is employed to exchange network traffic between the agent the resource server.

11. The system of claim 9, wherein performing further actions, further comprises:
providing credential information associated with the client to a preamble module that is included in the driver;
employing the preamble module to exchange one or more messages with the resource server based on an application protocol associated with the resource server; and
establishing the application session between the agent and the resource server based on the one or more messages.

12. The system of claim 9, wherein employing the server-tee module to modify the one or more responses from the resource server, further comprises:
inspecting network traffic associated with the one or more responses based on an application protocol associated with the resource server;
modifying the network traffic to replace one or more values in the inspected network traffic with one or more other values based on the application protocol and one or more overlay network policies; and
modifying the one or more responses to include the modified network traffic.

13. The system of claim 9, wherein employing the server-handler module to generate the log information, further comprises:
inspecting network traffic associated with the one or more copied responses;
determining one or more activity records associated with the one or more copied responses based on an application protocol associated with the resource server, wherein each activity record corresponds to a copied response; and
storing the one or more activity records in a log information data store.

14. The system of claim 9, wherein employing the server-handler module to generate the log information, further comprises:
inspecting network traffic associated with the one or more copied responses;
collecting one or more activity records associated with the one or more copied responses;
in response to the collection of the one or more activity records matching one or more conditions based on the application protocol and the server-handler module, generating one or more activity frames based on the one or more collected activity records, wherein the one or more activity frames are stored in a log data store.

15. The system of claim 9, wherein performing further actions, further comprises:
in response to an application session associated with the client request terminating, employing a finalizer module included in the driver to execute one or more actions to remove one or more artifacts associated with the application session based on the application protocol or the resource server.

16. The system of claim 9, wherein performing further actions, further comprises:
in response to detecting an error associated with the one or more responses, performing one or more other actions, including:
classifying the error based on one or more of an application protocol associated with the resource server, or network traffic associated with a network connection to the resource server;
resolving the classified error based on a classification of the error as resolvable, wherein the resolution of the error includes one or more of resending one or more client requests, or sending one or more modified client requests, and wherein the modifications to the one or more modified client requests include setting one or more values in the one or more modified client requests based on the application protocol.

17. A processor readable non-transitory storage media that includes instructions for managing access to network resources over a network, wherein execution of the instructions by one or more hardware processors on one or more network computers performs actions, comprising:
providing an overlay network that is employed to provide a secure tunnel between a client and a resource server; and
in response to a client request being provided to an egress mesh agent associated with the resource server, wherein the client request is provided via a first network connection, performing further actions, including:

determining a driver that is associated with the resource server based on the client request, wherein the driver includes one or more of a server-tee module and a server-handler module;

providing the client request to the resource server via a different second network connection;

providing one or more responses from the resource server to the server-tee module via the provided secure tunnel, wherein the server-tee module provides a copy of the one or more responses from the resource server to the server-handler module;

employing the server-handler module to generate log information based on the one or more copied responses; and employing the server-tee module to modify the one or more responses from the resource server, wherein the one or more responses are forwarded to the client via the first network connection over the overlay network and the modification is based on one or more localization features selected from geo-location information.

18. The media of claim 17, wherein performing further actions, further comprises:

employing a dialer module included in the driver to establish a second network connection between the agent and the resource server, wherein the second network connection is employed to exchange network traffic between the agent the resource server.

19. The media of claim 17, wherein performing further actions, further comprises:

providing credential information associated with the client to a preamble module that is included in the driver;

employing the preamble module to exchange one or more messages with the resource server based on an application protocol associated with the resource server; and establishing the application session between the agent and the resource server based on the one or more messages.

20. The media of claim 17, wherein employing the server-tee module to modify the one or more responses from the resource server, further comprises:

inspecting network traffic associated with the one or more responses based on an application protocol associated with the resource server;

modifying the network traffic to replace one or more values in the inspected network traffic with one or more other values based on the application protocol and one or more overlay network policies; and modifying the one or more responses to include the modified network traffic.

21. The media of claim 17, wherein employing the server-handler module to generate the log information, further comprises:

inspecting network traffic associated with the one or more copied responses;

determining one or more activity records associated with the one or more copied responses based on an application protocol associated with the resource server, wherein each activity record corresponds to a copied response; and storing the one or more activity records in a log information data store.

22. The media of claim 17, wherein employing the server-handler module to generate the log information, further comprises:

inspecting network traffic associated with the one or more copied responses;

collecting one or more activity records associated with the one or more copied responses;

in response to the collection of the one or more activity records matching one or more conditions based on the application protocol and the server-handler module, generating one or more activity frames based on the one or more collected activity records, wherein the one or more activity frames are stored in a log data store.

23. The media of claim 17, wherein performing further actions, further comprises:

in response to detecting an error associated with the one or more responses, performing one or more other actions, including:

classifying the error based on one or more of an application protocol associated with the resource server, or network traffic associated with a network connection to the resource server;

resolving the classified error based on a classification of the error as resolvable, wherein the resolution of the error includes one or more of resending one or more client requests, or sending one or more modified client requests, and wherein the modifications to the one or more modified client requests include setting one or more values in the one or more modified client requests based on the application protocol.

24. A network computer for managing access to network resources, comprising:

a memory that stores at least instructions; and one or more hardware processors that execute instructions that perform actions, including:

providing an overlay network that is employed to provide a secure tunnel between a client and a resource server; and in response to a client request being provided to an egress mesh agent associated with the resource server, wherein the client request is provided via a first network connection, performing further actions, including:

determining a driver that is associated with the resource server based on the client request, wherein the driver includes one or more of a server-tee module and a server-handler module;

providing the client request to the resource server via a second different network connection;

providing one or more responses from the resource server to the server-tee module via the provided secure tunnel, wherein the server-tee module provides a copy of the one or more responses from the resource server to the server-handler module; employing the server-handler module to generate log information based on the one or more copied responses; and employing the server-tee module to modify the one or more responses from the resource server, wherein the one or more responses are forwarded to the client via the first network connection over the overlay network and the modification is based on one or more localization features selected from geo-location information.

25. The network computer of claim 24, wherein performing further actions, further comprises:

employing a dialer module included in the driver to establish a second network connection between the agent and the resource server, wherein the second network connection is employed to exchange network traffic between the agent the resource server.

26. The network computer of claim 24, wherein performing further actions, further comprises:

providing credential information associated with the client to a preamble module that is included in the driver;

employing the preamble module to exchange one or more messages with the resource server based on an application protocol associated with the resource server; and establishing the application session between the agent and the resource server based on the one or more messages.

27. The network computer of claim 24, wherein employing the server-tee module to modify the one or more responses from the resource server, further comprises:

inspecting network traffic associated with the one or more responses based on an application protocol associated with the resource server;

modifying the network traffic to replace one or more values in the inspected network traffic with one or more other values based on the application protocol and one or more overlay network policies; and modifying the one or more responses to include the modified network traffic.

28. The network computer of claim 24, wherein employing the server-handler module to generate the log information, further comprises:

inspecting network traffic associated with the one or more copied responses;

determining one or more activity records associated with the one or more copied responses based on an application protocol associated with the resource server, wherein each activity record corresponds to a copied response; and storing the one or more activity records in a log information data store.

29. The network computer of claim 24, wherein employing the server-handler module to generate the log information, further comprises:

inspecting network traffic associated with the one or more copied responses;

collecting one or more activity records associated with the one or more copied responses;

in response to the collection of the one or more activity records matching one or more conditions based on the application protocol and the server-handler module, generating one or more activity frames based on the one or more collected activity records, wherein the one or more activity frames are stored in a log data store.

30. The network computer of claim 24, wherein performing further actions, further comprises:

in response to an application session associated with the client request terminating, employing a finalizer module included in the driver to execute one or more actions to remove one or more artifacts associated with the application session based on the application protocol or the resource server.

\* \* \* \* \*